United States Patent
Killoran, Jr.

(10) Patent No.: US 10,296,951 B2
(45) Date of Patent: May 21, 2019

(54) POINT OF SALE ELECTRONIC FUNDRAISING

(71) Applicant: @PAY IP Holdings LLC, Wilmington, DE (US)

(72) Inventor: John P. Killoran, Jr., Albuquerque, NM (US)

(73) Assignee: SWOOP IP HOLDINGS LLC, Wilmington, DE (US)

( * ) Notice: Subject to any disclaimer, the term of this patent is extended or adjusted under 35 U.S.C. 154(b) by 481 days.

(21) Appl. No.: 13/826,800

(22) Filed: Mar. 14, 2013

(65) Prior Publication Data

US 2014/0025599 A1    Jan. 23, 2014

Related U.S. Application Data

(63) Continuation of application No. 13/774,779, filed on Feb. 22, 2013, now Pat. No. 9,996,862.

(60) Provisional application No. 61/674,546, filed on Jul. 23, 2012.

(51) Int. Cl.

| | | |
|---|---|---|
| G06Q 30/00 | (2012.01) | |
| G06Q 30/06 | (2012.01) | |
| G06Q 20/32 | (2012.01) | |
| G06Q 20/02 | (2012.01) | |
| G06Q 20/12 | (2012.01) | |
| G06Q 20/20 | (2012.01) | |
| G06Q 20/38 | (2012.01) | |
| G06Q 10/10 | (2012.01) | |

(52) U.S. Cl.
CPC ....... *G06Q 30/0601* (2013.01); *G06Q 10/107* (2013.01); *G06Q 20/027* (2013.01); *G06Q 20/12* (2013.01); *G06Q 20/20* (2013.01); *G06Q 20/322* (2013.01); *G06Q 20/325* (2013.01); *G06Q 20/3255* (2013.01); *G06Q 20/382* (2013.01)

(58) Field of Classification Search
CPC .......................................... G06Q 30/00–30/08
USPC ................................................. 705/26.1–27.2
See application file for complete search history.

(56) References Cited

U.S. PATENT DOCUMENTS

| | | |
|---|---|---|
| 5,426,781 A | 6/1995 | Kaplan et al. |
| 5,664,110 A | 9/1997 | Green et al. |
| 5,694,546 A | 12/1997 | Reisman |
| 5,706,442 A | 1/1998 | Anderson et al. |
| 5,710,887 A | 1/1998 | Chelliah et al. |

(Continued)

FOREIGN PATENT DOCUMENTS

WO    2006/119342 A2    11/2009

OTHER PUBLICATIONS

Truxo, Ivo, Miva® Merchant: MmPGP Secure PGP Email Merchant Notification Module, http://mivo.truxoft.com/mm0001.htm, Jan. 21, 2011, pp. 1-10.

*Primary Examiner* — Michael Misiaszek
(74) *Attorney, Agent, or Firm* — Volpe and Koenig, P.C.

(57) ABSTRACT

An e-fundraizing system includes a mobile device and a server. The mobile device produces, or is configured to respond to, an indicator of one or more specific donation amounts. The mobile device sends a first message to the server in response to the indicator. The mobile device receives a second message in response to the sent first message. The mobile device receives a user input based on the received second message. The mobile device sends a third message to a server in response to the user input. A user of the mobile device donates a specific amount based on the sent third message.

15 Claims, 24 Drawing Sheets

(56) References Cited

U.S. PATENT DOCUMENTS

| | | |
|---|---|---|
| 5,758,328 A | 5/1998 | Giovannoli |
| 5,793,972 A | 8/1998 | Shane |
| 5,794,206 A | 8/1998 | Wilkinson et al. |
| 5,799,157 A | 8/1998 | Escallon |
| 5,809,242 A | 9/1998 | Shaw et al. |
| 5,825,881 A | 10/1998 | Colvin, Sr. |
| 5,826,242 A | 10/1998 | Montulli |
| 5,826,269 A | 10/1998 | Hussey |
| 5,838,790 A | 11/1998 | McAuliffe et al. |
| 5,848,397 A | 12/1998 | Marsh et al. |
| 5,855,008 A | 12/1998 | Goldhaber et al. |
| 5,864,823 A | 1/1999 | Levitan |
| 5,870,717 A | 2/1999 | Wiecha |
| 5,890,138 A | 3/1999 | Godin et al. |
| 5,897,622 A | 4/1999 | Blinn et al. |
| 5,899,980 A | 5/1999 | Wilf et al. |
| 5,905,973 A | 5/1999 | Yonezawa et al. |
| 5,970,469 A | 10/1999 | Scroggie et al. |
| 6,101,485 A | 8/2000 | Fortenberry et al. |
| 6,246,996 B1 | 6/2001 | Stein et al. |
| 6,938,048 B1 | 8/2005 | Jilk et al. |
| 6,954,737 B2 | 10/2005 | Kalantar et al. |
| 6,993,559 B2 | 1/2006 | Jilk et al. |
| 7,533,064 B1 | 5/2009 | Boesch |
| 7,577,587 B2 | 8/2009 | Gee |
| 7,912,910 B2 | 3/2011 | Banerjee et al. |
| 8,156,012 B1 | 4/2012 | Eisner et al. |
| 2002/0010746 A1 | 1/2002 | Jilk et al. |
| 2002/0065828 A1 | 5/2002 | Goodspeed |
| 2002/0103752 A1 | 8/2002 | Berger et al. |
| 2002/0120581 A1 | 8/2002 | Schiavone et al. |
| 2002/0178360 A1 | 11/2002 | Wenocur et al. |
| 2003/0217107 A1 | 11/2003 | Parry |
| 2004/0024655 A1 | 2/2004 | Estes |
| 2004/0204995 A1* | 10/2004 | Weng ............... G06Q 30/0232 705/14.32 |
| 2005/0044003 A1 | 2/2005 | O'Keeffe et al. |
| 2005/0251460 A1 | 11/2005 | Quigley |
| 2006/0212361 A1 | 9/2006 | Perkowski |
| 2007/0022007 A1 | 1/2007 | Lawe |
| 2008/0065513 A1* | 3/2008 | McHale ............... G06Q 30/02 705/26.3 |
| 2009/0276345 A1 | 11/2009 | Hughes |
| 2010/0010886 A1 | 1/2010 | Flynn, Jr. |
| 2011/0173094 A1* | 7/2011 | Krueger ............... G06Q 30/06 705/26.41 |
| 2011/0202615 A1 | 8/2011 | Fletcher |
| 2011/0264555 A1 | 10/2011 | Turner-Rielle |
| 2011/0295749 A1* | 12/2011 | Scalisi ............................ 705/44 |
| 2012/0109781 A1 | 5/2012 | Felt et al. |
| 2012/0276868 A1 | 11/2012 | Martell |
| 2012/0289191 A1* | 11/2012 | Puura ............................ 455/410 |
| 2013/0110707 A1* | 5/2013 | Robins ............................ 705/39 |

\* cited by examiner

POINT OF SALE ELECTRONIC FUNDRAISING

CROSS REFERENCE TO RELATED APPLICATION

This application is a continuation of U.S. patent application Ser. No. 13/774,779, filed Feb. 22, 2013, which claims the benefit of U.S. provisional application No. 61/674,546, filed Jul. 23, 2012, which are incorporated herein by reference as if fully set forth.

BACKGROUND

The most recent presidential elections have proven the power of grass-roots fundraising. Although large donations from wealthy donors are still a major part of politics, the internet has enabled small donations from huge numbers of donors to be a politically powerful force.

In a similar manner, charitable organizations are consistently looking for additional sources of revenue, particularly in difficult economic times. Since the internet enables charitable organizations to reach huge numbers of people, it is a perfect mechanism for increasing fundraising efforts.

Finally, fundraising at a live event, whether it is at a political rally or a charitable event, is a perfect opportunity to maximize donations. Reaching out to an organization's base at such an event presents an unparallel opportunity in fundraising circles to strengthen an organization's ties with its donor base.

According to many current approaches to electronic fundraising (e-fundraising), a donor may register with an organization, (such as a charity or a political organization), to receive emails that provide information about the charitable cause or political candidate. The emails may include hyperlinks that direct the user to web pages on the organization's web site. At the web site, the donor may obtain additional information about the charitable cause or political candidate described in the emails and donate thereto.

If the donor originally received an email in a dedicated email application such as Microsoft Outlook, a different application (such as a web browser) must be used in order to view the web pages on the vendor's web site. Further, to donate to the organization's web site, donors are frequently required to enter payment information such as credit card, bank account, or other billing information. Due to this switch to a different application and the entry of credit card information, the process of donating becomes inconvenient and time-consuming. More often than not, donors get frustrated and ultimately abandon the donation effort.

Therefore, more streamlined and convenient approaches to e-fundraising would be advantageous.

SUMMARY

An e-fundraising system includes a mobile device and a server. A user of the mobile device may generate an indication or an offer of a donation, or respond to a solicitation, for a charitable cause or political candidate. The mobile device may send a first message to the server in response to the indication. The mobile device may receive an email in response to the sent first message, asking the user to confirm the details of the donation. The user reviews the details and, based on the user's input, the mobile device may send a second message to a server to confirm the donation. A user of the mobile device is able to donate based on the sent second message or, in an alternative embodiment, the sent first message.

BRIEF DESCRIPTION OF THE DRAWINGS

A more detailed understanding may be had from the following description, given by way of example in conjunction with the accompanying drawings wherein.

DETAILED DESCRIPTION

Figure 1:
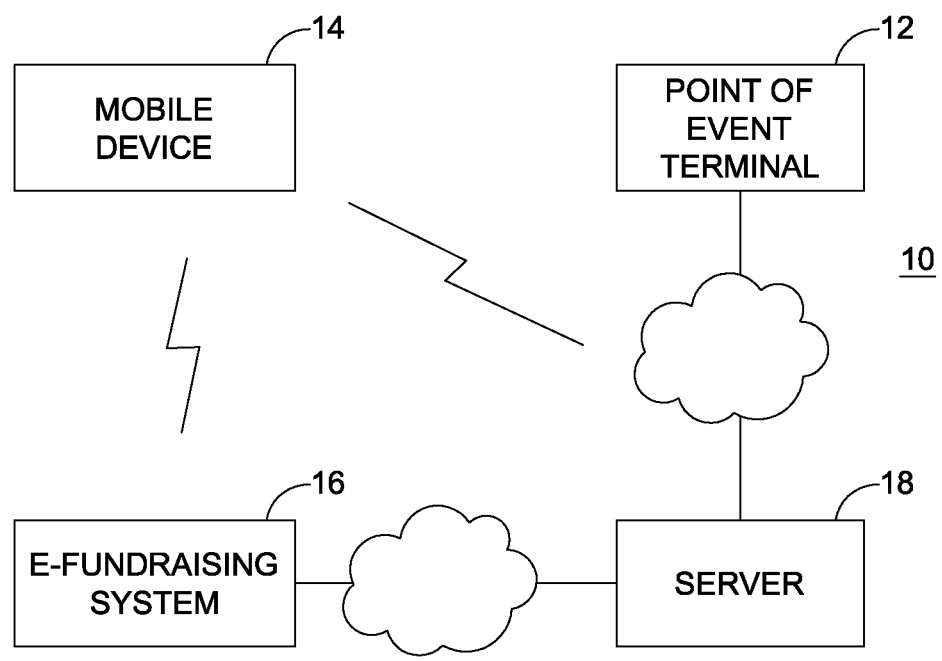
FIG. 1 shows a logical architecture for engaging in point-of-event transaction using email.

FIG. 1 shows an example logical architecture 10 for e-fundraising. The example architecture 10 may include a point-of-event terminal 12, a mobile device 14, an email-based e-fundraising system 16, and a server 18. Although the point-of-event terminal 12, e-fundraising system 16 and server 18 are shown as separate components, they may be physically separate components, they may be integrated together into one or two components, or alternately may be distributed over more than three components.

Although the server 18 may be referred to as point-of-event server, (i.e. at a fundraising event), the server 18 need not be located at the point-of-event. The server 18 may be physically located remotely, such as through an Internet connection. The server 18 may be a server associated with the non-profit organization or may be a financial institution. The point-of-event terminal 12, the server 18 and the e-fundraising system 16 are shown as communicating via the Internet. However, those of skill in the art would understand that this is merely for convenience of explanation and any communication means, public or proprietary, may be utilized. Additionally, the mobile device 14 as shown is able to communicate wirelessly with the point-of-event terminal 12, the server 18 and the e-fundraising system 16. This wireless communication may comprise cellular 3G or $G or later, Bluetooth, 802, near field communication or other wireless transfer medium.

Figure 2:
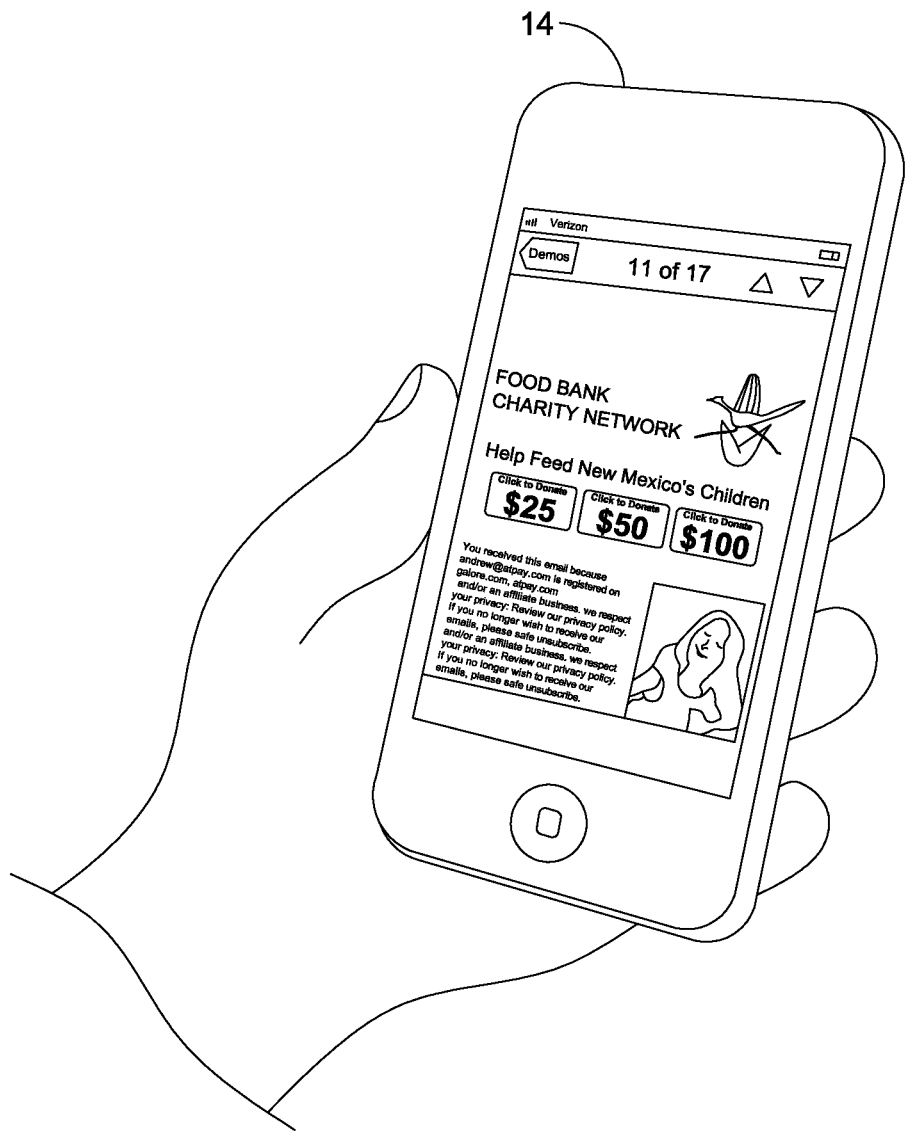
FIG. 2 is a mobile device implementing the present email based e-fundraising.

The mobile device 14 may include a processor, memory a wireless transceiver and a graphical user interface. For example, the mobile device 14 may be implemented as a smartphone as shown in FIG. 2. This enables communication regardless of the user's location. The e-fundraising system 16, server 18 and point-of-event terminal 12 may each include a processor and memory.

Figure 3:
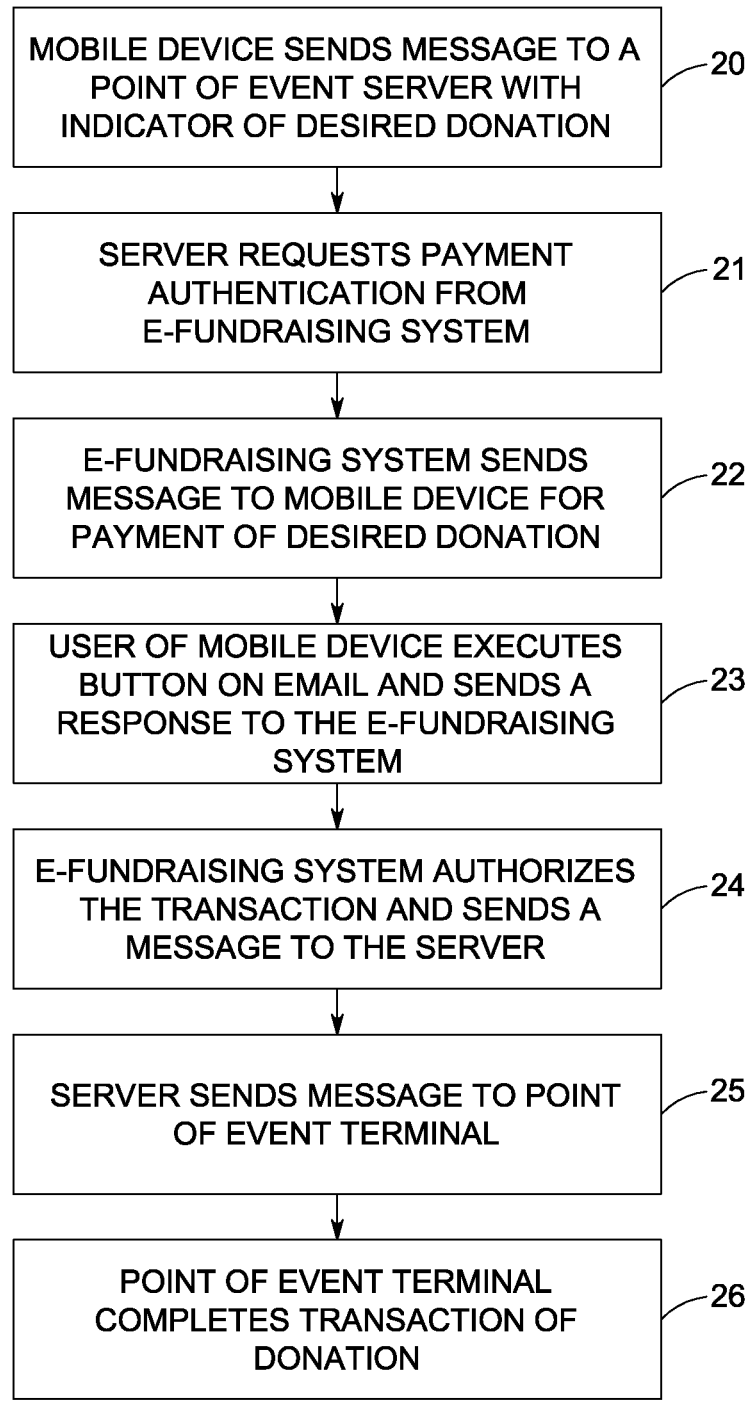
FIG. 3 shows a flow diagram of a point-of-event transaction using email.

FIG. 3 is a method 300 for point-of-event based email e-fundraising and is described in context with the example system architecture 10 of FIG. 1. A user of a mobile device 14 desires to make a donation. It should be understood by those of skill in the art that the terms "donor" and "user" may be used interchangeably hereinafter for convenience to describe the present invention.

A point-of-event terminal 16 may be used to communicate with the mobile device 14 in order to facilitate the donation transaction. The point-of-event terminal 16 may be a cash register-type device, a computer or computing device, a mobile device, a vending machine or other sales-type or commerce-type devices.

Alternatively, the point-of-event terminal 12 may be "virtual" terminal, essentially comprising a website that users may access remotely using a smartphone, a laptop, a computer or a tablet device or the like via a wireless connection, through the Internet or via a proprietary network. In this alternative, the point-of-event terminal 12 and the server 18 may comprise the same physical computing device.

Each non-profit organization or event may have an associated short message service (SMS) address, URL, email address, code, or product/service/donation indicia; all of which will be collectively referred to hereinafter for convenience as an address. A message, including the donation amount and an address, may ultimately be sent (step 20) by the mobile device 14 to the point-of-event terminal 12.

The message may be originally generated by a user of the mobile device 14, who inputs a donation indication, which comprises all of the relevant donation information such as the organization and the amount of the donation.

Alternately, a solicitation for a donation may be wirelessly sent to the mobile device 14 by the point-of-event terminal 12, and the user simply responds to this solicitation. This eliminates the requirement for the user to manually input all of the information via the mobile device 14, which is cumbersome and prone to user errors. Additionally, the indicator may be input into the mobile device 14 using input devices of the mobile device, such as by the mobile device 14 taking a picture of a bar code, QR code text or symbol of the non-profit organization.

The point-of-event terminal 12 and the server 18 may have the same functionality. However, the point-of-event terminal 12 may be typically utilized when a user is in the presence of the point-of-event terminal 12, such as being physically present at a charitable or fundraising event or rally. The mobile device 14 sends the message (step 20) to either the point-of-event terminal 12 or the server 18, (or to the server 18 through the point-of-event terminal 12), with the indicator of the desired donation.

It should be understood that the functionality of the point-of-event terminal 18 may be incorporated into the server 18. Alternatively, the mobile unit 14 may communicate directly with the server 18, in which case, the point-of-event terminal 12 is unnecessary.

Although the e-fundraising system 16 may be referred to as "email-based", that is only one alternative. As stated hereinbefore, the message may be a short message service (SMS) message, multimedia message service (MMS), email, software application-generated message, a tweet or any other type of message. The e-fundraising system 16 may handle any type of electronic message. For example, an MMS may be sent to an address of the non-profit organization including a picture of the desired donation amount, such as a QR code.

It should also be understood that in an alternative embodiment, the mobile device 14 may receive a message (for example, an email), either a single or "blast" email message or solicitation from the point-of-event terminal 12 or the server 18. For example, upon arriving at an event, a person may "register" by providing contact information such as a mobile number or email address. Event organizers then send a message to the event attendees, via their mobile units 14. Each user, via their unit 14, then responds to this message to the point-of-event terminal 12 with the indication; i.e. a message including the desired donation amount.

Once the user generates the message, replies to a received message or solicitation, or otherwise confirms indicia sent to the mobile device 14, the message is received by the server 18. The server 18 identifies the donation amount associated with the message. To obtain payment for the donation, the server 18 requests payment authentication (step 21) from e-fundraising system 16. Although the e-fundraising system 16 may be referred to as "email-based", that is only one alternative. The e-fundraising system 16 may handle any type of aforementioned message. As stated hereinbefore, the message may be a short message service (SMS) message, multimedia message service (MMS), email, software application-generated message, a tweet or any other type of message. The e-fundraising system 16 may handle any type of electronic message. In one example, an MMS may be sent to an address of the non-profit-organization including a picture of the desired donation amount, such as a QR code.

The server 18 sends information regarding the requested donation to the e-fundraising system 16. The information may be a phone number of the mobile device 14, email address, MAC address, or other identifier of the mobile device 14 along with a donation amount and the non-profit organization. An example of such an email based e-fundraising system 16 is described hereinafter with respect to e-commerce system 10.

Figure 4:
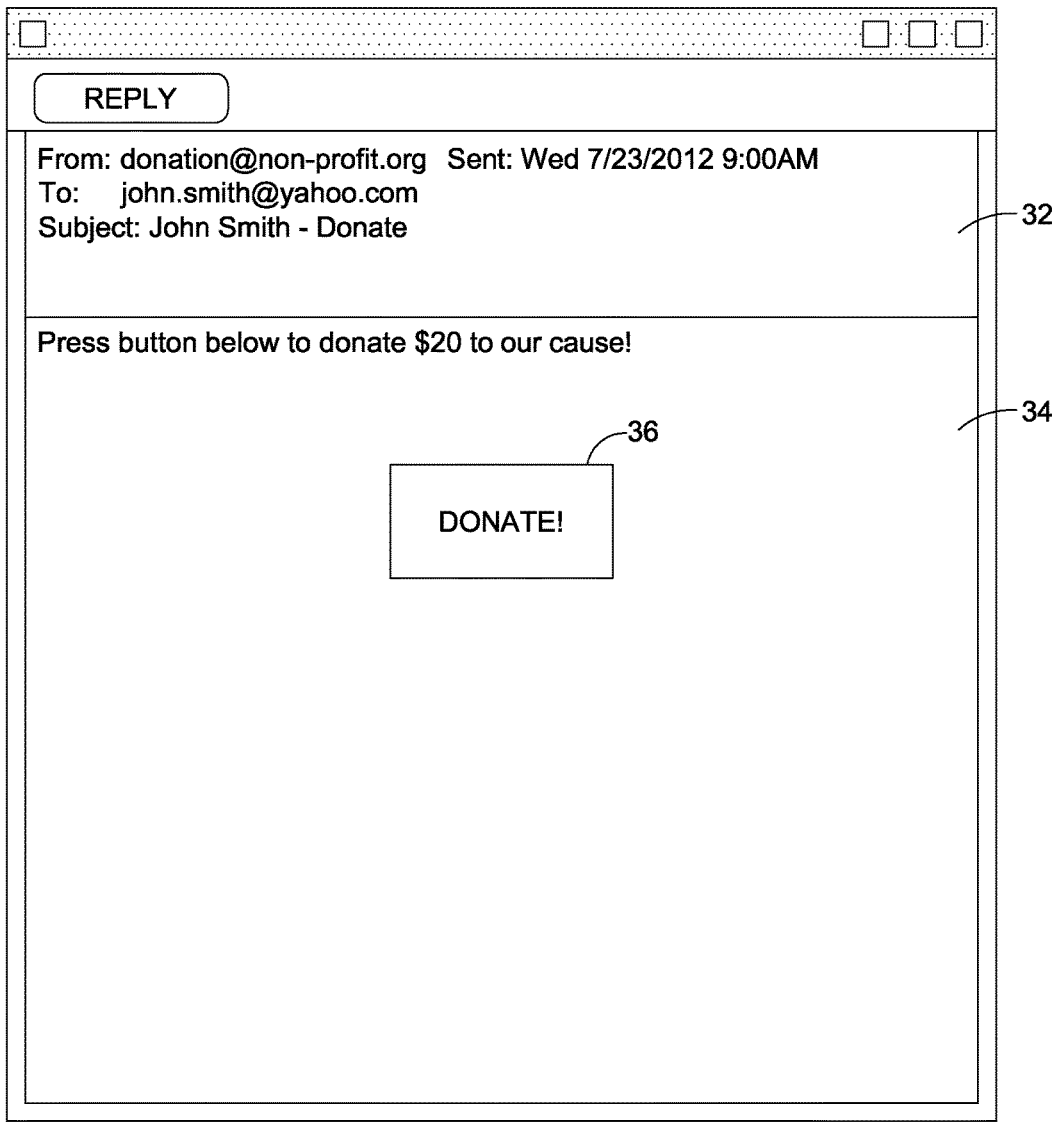
FIG. 4 is an example of an email for authorizing a transaction.

The e-fundraising system 16 sends a donation confirmation message to the mobile device 14 for payment of the desired donation, (step 22). One such example of the donation confirmation message is an email 30 to the mobile device 14 as shown in FIG. 4. The email 30 shown in FIG. 4 has email header information 32, such as an origination email address, a destination email address, a date and a subject line. The email 30 also has a body 34. The body 34 of the email includes a button 36 for the user to select to confirm the donation. The body 34 may have additional text describing the transaction.

Although a single button 36 is shown, multiple buttons 36 may be provided to select different donation amounts as will be described hereinafter. Although the email 30 is shown with a button 36, other user inputs may be used to confirm the purchase, such as a single reply to the email 30 or other input.

After the user of the mobile device 14 executes the button 36 and selects the reply button, the mobile device 14 sends a response to the e-fundraising system 16, (step 23), confirming the purchase, the e-fundraising system 16 authorizes the transaction and sends a message to the server 18, (step 24).

The server 18 sends a message to the point-of-event terminal 10 to confirm the transaction, (step 25). It should be understood that steps 25 and 26 are optional in that the e-fundraising system 16 may send such a message directly to the mobile unit 14, completing the donation transaction.

In the event that the point-of-event terminal 18 is utilized to complete the transaction of the event, (step 26), some type of "completion" action may follow. For example, a printer may print out a receipt confirming the donation, a vending machine may vend a product, a cash register may register payment, or a video screen may acknowledge the donation in front of all of the donors attending the event. Accordingly, as described, the email-based e-donation system 16 confirms the payment for the donation. Once that payment is confirmed, the server 18 may confirm the sale on behalf of the non-profit organization and the point-of-event terminal 12 executes the transaction with the user of the mobile device 14.

The method 300 of FIG. 3 has been described with reference to the point of event terminal 12, the server 18 and the e-fundraising system 16 as separate components. However, this has been for convenience only. It should be understood by those of skill in the art that all of these components 12, 16, 18 (and also all of the components in the electronic payment gateway 114 shown in FIG. 5) may all be software modules located on a single server. As such, some of the steps described in FIG. 3 will be unnecessary. For example, the signaling between the server 18 and the e-fundraising system 15 in steps 21 and 24 will be unnecessary since they may be performed in the same server.

Figure 5:
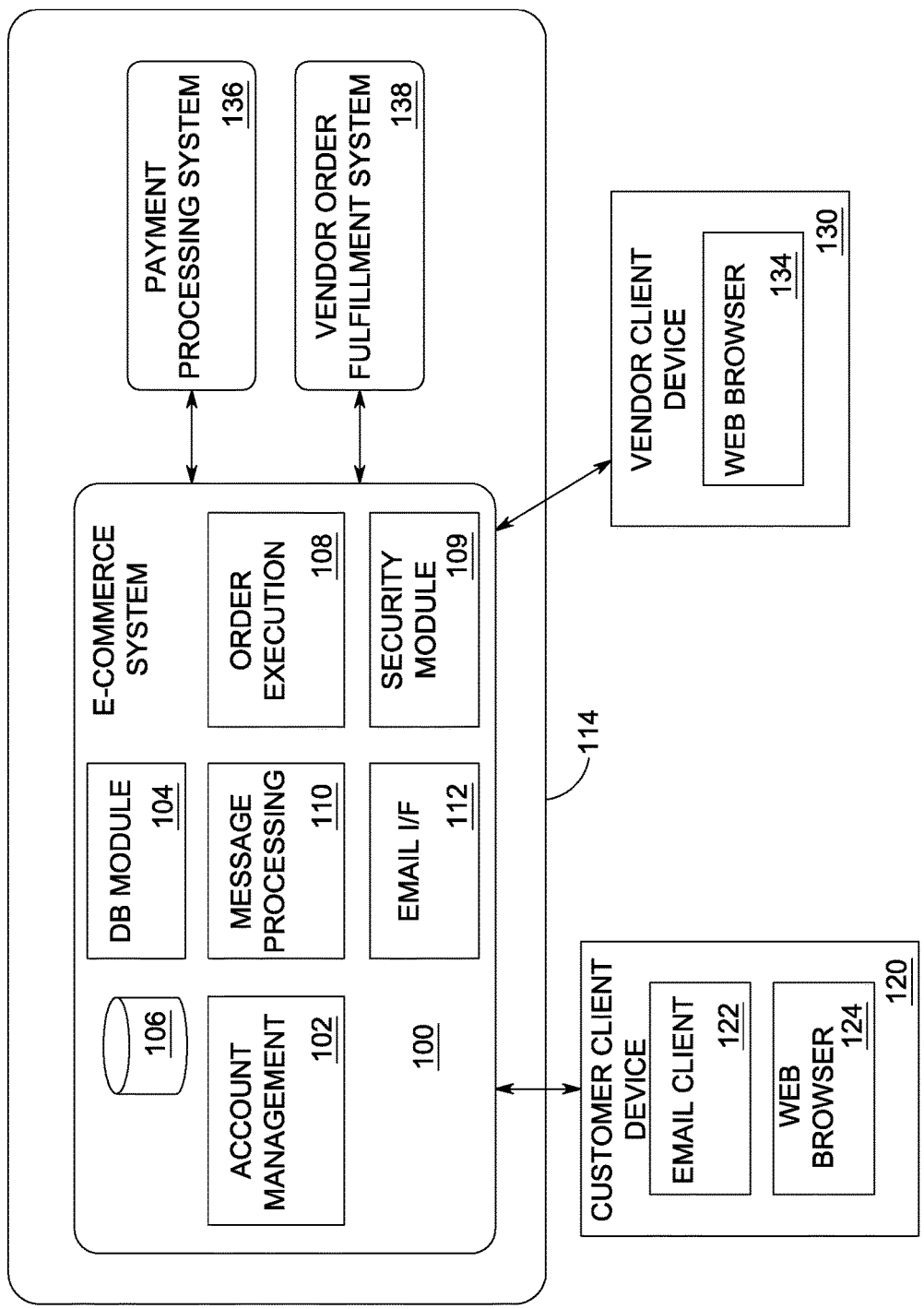
FIG. 5 shows a logical architecture for an electronic payment gateway using email or other forms of electronic communication.

FIG. 5 shows a detailed of architecture for one particular example implementation of the e-fundraising system 16. In this implementation, the e-fundraising system is embodied as an electronic payment gateway 114.

The electronic payment gateway 114 may include a customer client device 120, an e-commerce system 100, a payment processing system 136, a vendor order fulfillment system 138, and a vendor client device 130. The e-commerce system 100 may include an account management module 102, a database module 104, an e-commerce database 106, an order execution module 108, a security module 109, a message processing module 110, and an email interface module 112. As will be described in further detail below, the e-commerce system 100 and customer client device 120 may exchange email messages to initiate and manage transactions such as donations to non-profit organizations and/or the purchase of goods. The e-commerce system 100 may be coupled to a payment processing system 136 and (optionally) a vendor order fulfillment system 138. This coupling will be referred to hereinafter as an electronic payment gateway 114. Also as will be described in further detail below, the e-commerce system 100 may communicate with the payment processing system 136 and the vendor order fulfillment system 138 to execute the transactions.

The account management module 102 in the e-commerce system 100 may manage data related to accounts for customers and vendors that participate in commerce via the e-commerce system 100. The account management module 102 may be or include, for example, a web application. Vendors may interact with the account management module 102 via a web browser such as the web browser module 134 in the vendor client device 130. As one example, a user of the vendor client device 130 may provide information to the account management module 102 such as: product and pricing information to be used for email advertisements to be sent to customers in email campaigns; email formatting information to be used for email advertisements to be sent to customers; financial information related to bank accounts and/or other types of financial accounts (such as e-Payment accounts such as PayPal accounts) that may be used to received payments from customers of the e-commerce system 100, such as account numbers and/or other identifying information; and/or other information.

Customers may register with the e-commerce system 100 by interacting with the account management module 102 via a web browser such as a web browser module (not depicted) in the customer client device 120. A user of the customer client device 120 may provide information to the account management module 102 via the web browser such as: an email address associated with the customer; financial information associated with the customer, such as a credit card information (such as a credit card number and expiration date), and/or other information related to bank accounts and/or other types of financial accounts (such as e-Payment accounts) that may be used to make payments to vendors via the e-commerce system 100; shipping address information; billing address information; preferences regarding which vendors the customer would like to receive email advertisements from; and/or other information. The account management module 102 may, via the database module 104, store information received from the customer client device 120 and/or the vendor client device 130 in the e-commerce database 106. The account management module 102 may also add information to the e-commerce database 106 when customers and vendors register with the e-commerce system 100, such as customer identifiers, vendor identifiers, and other identifying information.

The security module 109 generates a plurality of Universal Unique Identifiers (UUIDs) 202. A UUID is an identifier standard used in software construction, standardized by the Open Software Foundation (OSF) as part of the Distributed Computing Environment (DCE).

Utilizing UUIDs is to enable distributed systems to uniquely identify information without significant central coordination. Since the identifiers have a finite size, it is possible for two differing items to share the same identifier. However, the identifier size and generation process are selected such that this is sufficiently unlikely.

In one embodiment, the UUIDs have a length of 32 characters, in groups, separated by a "dash" (–) character. For example, in one embodiment, an example generated the code may be: 891BE826-0023-4DAD-9E53-EE62B-836079C.

The message processing module 110 (in conjunction with the email interface module 112) may generate and transmit advertisement email messages to customers that are registered with the e-commerce system 100, such as the user of the customer client device 120. The advertisement email messages may be HyperText Markup Language (HTML) email messages, Rich Text Format (RTF) email messages, and/or may be defined according to any other appropriate format. The advertisement email messages may include Uniform Resource Identifiers (URIs) or hyperlinks that are defined according to the mailto URI scheme. Each mailto URI or hyperlink may describe an email message that may be generated by an email client module (such as the email client module 122) when that URI or hyperlink is selected. The generated message may include a number of parameters that indicate, for example, a product that was advertised in the advertisement email that the customer wishes to purchase. The generated message may then be sent to the e-commerce system 100, and received by the message processing module 110. When the generated message is received by the message processing module 110, the message processing module 110 may then initiate a transaction to purchase the product indicated in the message on behalf of the customer. In such an instance, the message processing module 110 may interact with the order execution module 108 to perform the transaction.

The email interface module 112 may be configured to use one or more email accounts that are associated with the e-commerce system 100, and to send and receive messages associated with the one or more email accounts. The email interface module 112 and/or the email client module 122 in the customer client device 120 may communicate email messages using technologies such as Simple Mail Transfer Protocol (SMTP), Post Office Protocol (POP) technology, Internet Message Access Protocol (IMAP), Remote Procedure Call (RPC) technology, HyperText Transfer Protocol (HTTP), and/or other appropriate technologies. The interface module 112 and/or the email client module 122 may use these technologies to transmit and/or receive email messages via one or more email servers (not depicted). The email client module 122 may be or include an email client such as Microsoft Outlook, Thunderbird, a web browser application, or any other client application for the communication of email messages. In an instance where the email client module 122 is or includes a web browser application, the email client module 122 may be the same web browser described above that may be used to communicate with the account management module 102; alternatively the email client module 122 and the web browser described above that may be used to communicate with the account management module 102 may be different.

Although the email interface module 112 has been described as handling emails, this module 112 may receive and transmit often forms of electronic communication in a like manner. For example, the email interface module 112 may have the ability to receive SMS, MMS, texts, tweets, instant message, Facebook posts or any other form of electronic communication.

The payment processing system 136 may be, as one example, a payment gateway that is operated by an acquiring financial institution. In one instance, the payment processing system 136 may have a connection to one or more banking networks (not depicted) that it may use to process payments. The order execution module 108 may communicate with the payment processing system 136 using technology such as Transport Layer Security (TLS) or Secure Sockets Layer (SSL) technology. The vendor order fulfillment system 138 may be an order management system (OMS), Enterprise Resource Planning (ERP), supply chain management, electronic purchasing system, inventory control system, or any other appropriate system for fulfilling orders.

The e-commerce database 106 may store information such as information that describes email campaigns, email advertisements that may be sent to customers, customer information, vendor information, product information, donation-related information, order status information, and/or other information. Further, the e-commerce database 106 may store information that indicates correspondences between different email campaigns, advertisements, customers, vendors, products, donations, information related to order statuses, and/or other information. For each email campaign, the e-commerce database 106 may store information that includes an identifier of the vendor associated with the campaign, identifiers of the products associated with the campaign, and/or other information. For each order that is placed with the e-commerce system 100, the e-commerce database 106 may store information such as an identifier of the customer that placed the order, when the order was placed, an identifier of the vendor associated with the order, and/or other information.

For each product described in the e-commerce database 106, the e-commerce database 106 may store information that includes an identifier of the product (or donation), a description of the product, a title of the product, an identifier of the vendor associated with the product, a cost of the product, and/or other information. According to one approach, data that describes donations may be handled within the e-commerce database 106 in the primarily the same way as the data that describes products. As one example, (which will be described in detail hereinafter with reference to FIG. 7), the e-commerce database 106 may store information that indicates that a type of wine (e.g., "Wine One," with a product identifier of "0005") is sold by a vendor (e.g., "The Wine Shop," with a vendor identifier of "0163") for $15.00.

In an additional example, (which will be described in detail hereinafter with reference to FIG. 16), the e-commerce database 106 may also store information that indicates that an example vendor that is a non-profit organization (e.g., "Charitable Organization," with a vendor identifier of "1043") may receive donations for $5.00, $10.00, $25.00, $50.00, and $100.00. Each of the different donation amounts may be stored in the e-commerce database 106 as a different donation. For example, the $100 donation may have a donation identifier of "0099." Further according to this example, the e-commerce database 106 may store information that indicates that the donation with identifier "0099" indicates a donation of $100.00 to a vendor with the identifier of "1043." Alternatively or additionally, the e-commerce database 106 may store information (e.g., one or more flags or other fields) that indicates, for each product/donation, whether the product/donation relates to a donation or to a purchase of goods. It should be understood that the identifiers noted herein are examples only, and any type of example identifier may be utilized. Preferably, the identifiers are such that they are indecipherable by third parties.

The e-commerce database 106 may be spread across one or any number of computer-readable storage media (not depicted). The e-commerce database 106 may be or include, for example, a relational database, a hierarchical database, an object-oriented database, a flat file, a spreadsheet, or a structured file. The database module 104 may interface with a database management system (not depicted) in order to add data to, modify data in, or obtain data from the e-commerce database 106. Alternatively or additionally, the database module 104 may perform database driver and/or database client functionality to interact with the database management system. The database management system may be based on a technology such as Microsoft SQL Server, Microsoft Access, MySQL, PostgreSQL, Oracle Relational Database Management System (RDBMS), Not Only SQL (NoSQL), or any other appropriate technology.

Each or any combination of the modules described above with reference to FIG. 5 (including the account management module 102, database module 104, order execution module 108, message processing module 110, email interface module 112, email client module 122, web browser module 134, and the web browser module 124 in the customer client device 120) may be implemented as software modules, specific-purpose processor elements, or as combinations thereof.

Suitable software modules include, by way of example, an executable program, a function, a method call, a procedure, a routine or sub-routine, one or more processor-executable instructions, an object, or a data structure. Additionally, the system 100 or the electronic payment gateway 114 may comprise a single server or computer, or may comprise a plurality of servers or computers, or a much larger integrated or distributed computer network including a plurality of computers and communication devices and networks. One example of such an extended network is the Internet. The terminology "customer client device 120" will be referred to hereinafter as comprising a mobile or stationary device or terminal. This may include, but is not limited to, a smartphone (as shown in FIG. 2), a tablet, a computer, a laptop or any other type of fixed or mobile computing device.

Security and the integrity of information has become a primary concern of Internet users and vendors alike. Accordingly, one feature of the present invention is a system and method for authenticating electronic communications, such as emails, and ensuring the integrity of the ensuring electronic transaction.

As will be described in greater detail hereinafter, the system and method utilize a plurality of unique identifiers that are associated with specific authentication information. These unique identifiers are selectively embedded in each transmitted outgoing electronic communication. Although the electronic communication will be referred to hereinafter as an email, other aforementioned forms of electronic communication may also be utilized in accordance with the present invention.

Figure 7:
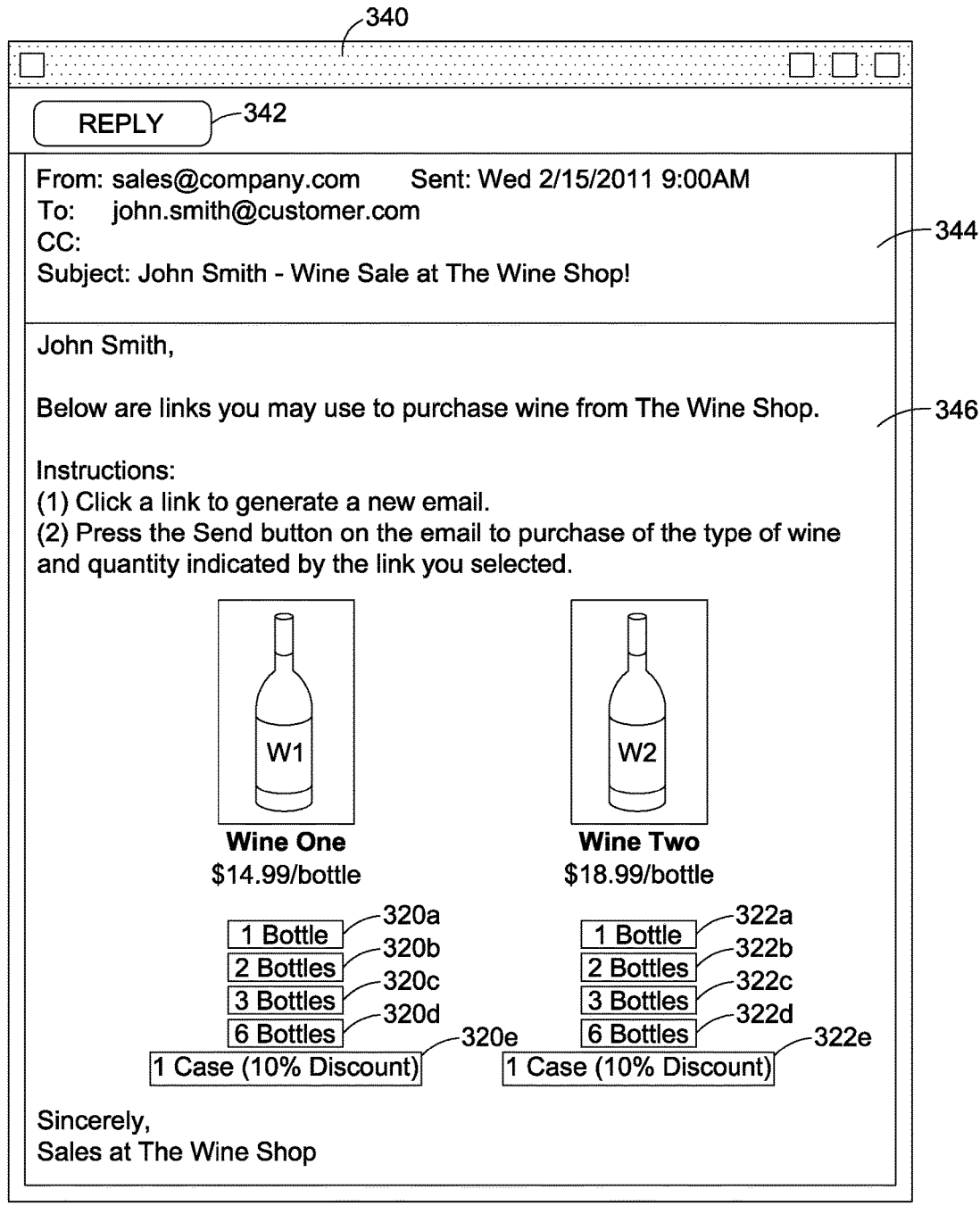
FIG. 7 is an example of an outgoing advertisement email message that solicits the purchase of goods from a vendor.

FIG. 7 is an example of an outgoing email 340. As will be explained in detail hereinafter, the outgoing email 340 includes a plurality of selectable hyperlinks or buttons 320a-e, 322a-e, each of which having an associated embedded unique identifier. Any incoming email (i.e. reply email) that is received in response to the outgoing email 340 should include one or more of these embedded unique identifiers if the reply email is to be authenticated.

When a reply email is received, it is parsed for evidence of one or more of these embedded identifiers. The one or more of the embedded identifiers are compared to the authentication information. If the comparison is favorable, the authentication of the reply email is complete. If the comparison is not favorable, additional measures are taken to attempt to authenticate the reply email, or the authentication process is ultimately terminated, and the reply email is deemed to be unauthenticated and the transaction is denied.

Figure 6:
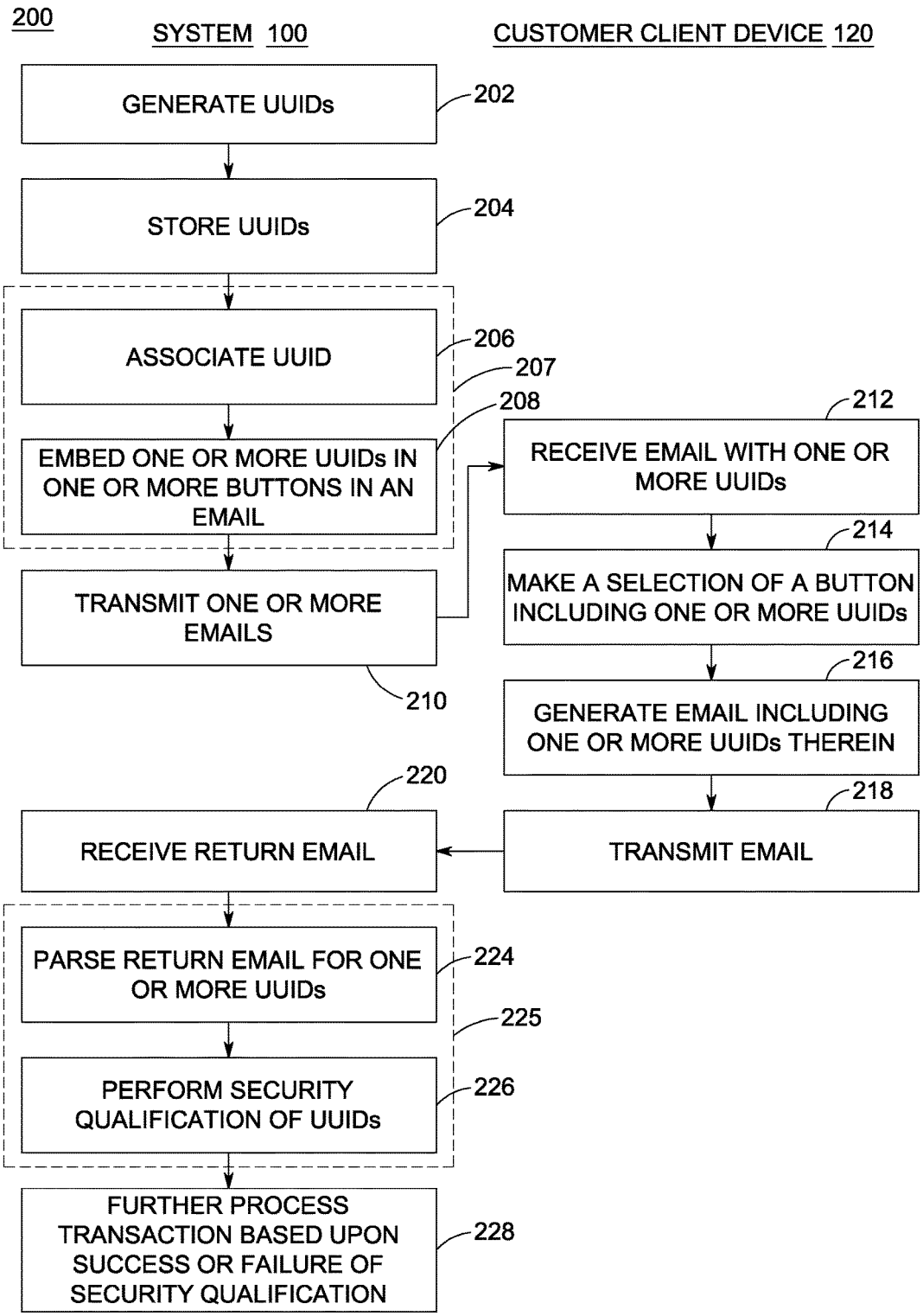
FIG. 6 shows a method for authenticating an email.

Referring to FIG. 6, a method 200 for authenticating an email in accordance with the present invention is shown. As aforementioned, although this method 200 is explained with reference to an email, other forms of electronic communication such as a text, as SMS, an MMS, an instant message, a tweet, a Facebook message or any other type of electronic communication may be utilized. The method 200 is shown between the e-commerce system 100 and a customer client device 120. As aforementioned, the security module 109 generates 202 a plurality of UUIDs. The UUIDs as delivered in an email message are "opaque", in that the associated authentication information is not ultimately derivable by third parties from parsing the UUID. Although the UUID will be associated with particular authentication information within the database 106, (such as a user, a campaign, a particular item or donation amount, an expiration date, etc.), this information is not derivable by third parties from the UUID.

Once the UUIDs are generated 202, they are stored 204 in the database 106 for later use. It should also be understood by those of skill in the art, that the storing 204 of the UUIDs is not necessary, in that the UUIDs may be generated 102 upon demand, (i.e. when they are needed), so that storing 204 of the UUIDs is not necessary. Accordingly, those of skill in the art should understand step 204 as being optional.

When a new email "campaign" is to be conducted, the UUIDs are retrieved from memory, (or the UUIDs are generated upon demand if they were not previously generated and stored). The UUIDs are associated 206 with particular authentication information to create an authentication control packet 300. This will be explained in greater detail hereinafter with reference to FIG. 6B.

Figure 8:
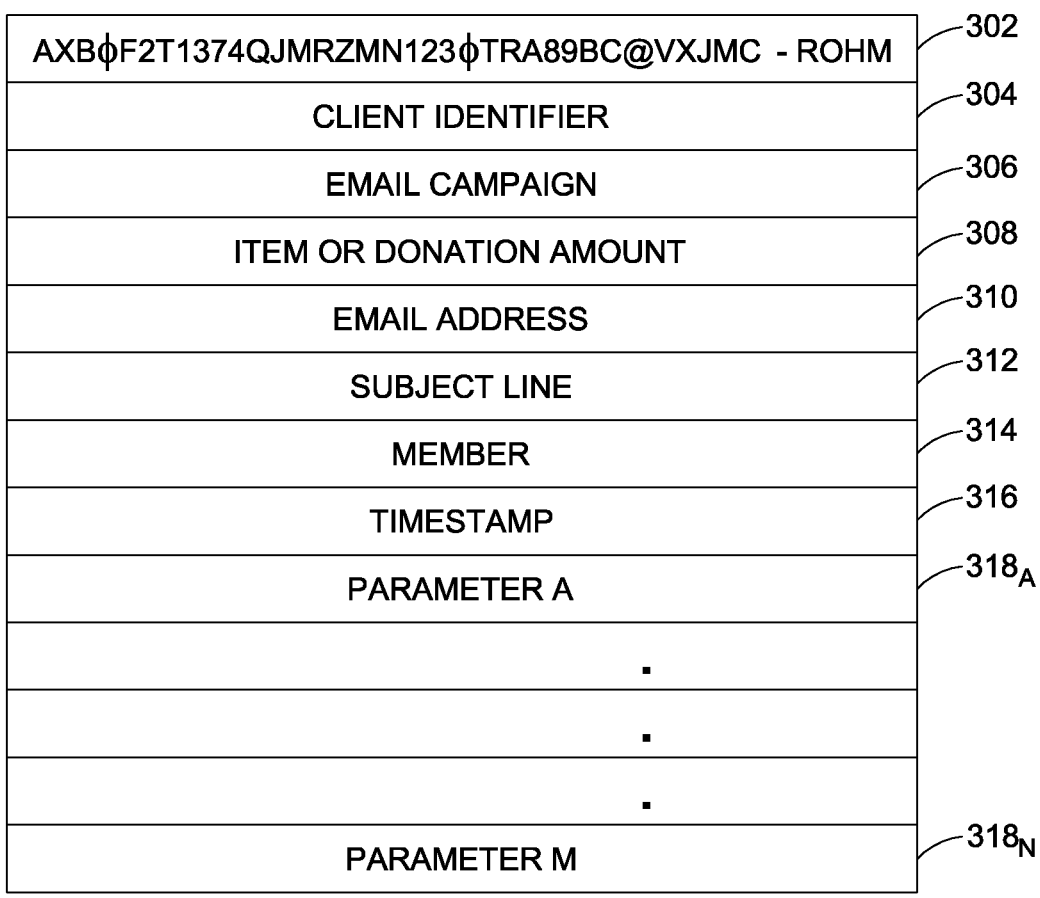
FIG. 8 is an example authentication control packet.

Referring to FIG. 8, an authentication control packet 300 is shown. The portions of the authentication control packet 300 will be described with reference to FIG. 8, and the related portions of an associated email will be described with reference to FIG. 7. The authentication control packet 300 includes a UUID 302 and a plurality of fields 304-318$_N$ relating to authentication information. Although specific fields 304-318$_N$ are shown and described herein, it should be understood by those of skill in the art that a subset of these fields may be used, more fields may be added to this list of fields, or a completely new set of fields may be used without departing from the teachings herein. Each field 302-318$_N$ comprises a different qualification parameter as will be described hereinafter with reference to FIG. 10.

As will be described in detail hereinafter, the UUID 302 is the unique identifier that will be imbedded in a portion of an email, for example outgoing email 340 shown in FIG. 7, and parsed from a reply email and used for authentication. In this particular example, the fields 304-318$_N$ include a client identifier field 304, an email campaign field 306 an item or donation amount field 308, an email address field 310, a subject line field 312, a member field 314 and a timestamp field 316. As is graphically illustrated by fields 318$_A$-318$_N$, a plurality of other fields relating to other identification parameters may optionally be included.

The client identifier field 304 identifies the particular client or vendor who has initiated the email "campaign". By way of example, if the vendor is The Wine Shop, the client identifier field 304 will include the name The Wine Shop, or an alpha-numeric identification thereof.

The email campaign field 306 identifies the particular email "campaign" of which the email is a part. By way of example, a particular vendor may wish to send out several email "blasts" to all or portions of its customers during different times of the year, to different customers or highlighting different products. Each email blast may be distinct, or may be coupled with one or more other email blasts. Each of these emails is referred to hereinafter as an email "campaign". The email campaign field 306 identifies one of the email campaigns of which this UUID 302 is a part.

The item or donation amount field 308 identifies a particular item or a particular donation amount that this UUID 302 is associated with. For example, the UUID 302 may be associated with the "one bottle of red wine" button selection. In an alternative example, the UUID 302 may be associated with a donation amount of $150.

The email address field 310 identifies the email address to which the UUID 302 will be sent.

The subject line field 312 identifies the subject line of the email in which the UUID 302 will be sent.

The member field 314 identifies the member associated with the email address to which the UUID 302 will be sent.

The timestamp field 316 identifies the time at which the email associated with the UUID 302 is sent, or created, or some other specific time.

The parameter A—parameter M fields $318_A$-$318_N$, graphically represent a plurality of other fields that may be used to provide additional levels of security and verification. For example, emails may be send from one or more servers or countries, or may include one or more "keys" that will be later used to verify whether a particular email is authentic.

Referring back to FIG. 6, after each UUID is associated is associated 206 with particular authentication information to create an authentication control packet 300, one or more UUIDs are embedded in an email 340 as one or more buttons 320a-e, 322a-e, as shown in FIG. 7. The process 207 of steps 206 and 208 will be described in greater detail with respect to FIG. 9.

The process 207 begins with the retrieval 207a or generation of one or more UUIDs. An associated email is generated 207b, and the one or more UUIDs are associated 207c with (or embedded into) one or selectable buttons 320a-e, 322a-e within the email 340. The one or more buttons 320a-e, 322a-e are inserted into the email 314, and then the remainder of the information is inserted 207c into the email 340. The UUID along with the authentication control packet 300 is then stored 207f.

Figure 9:
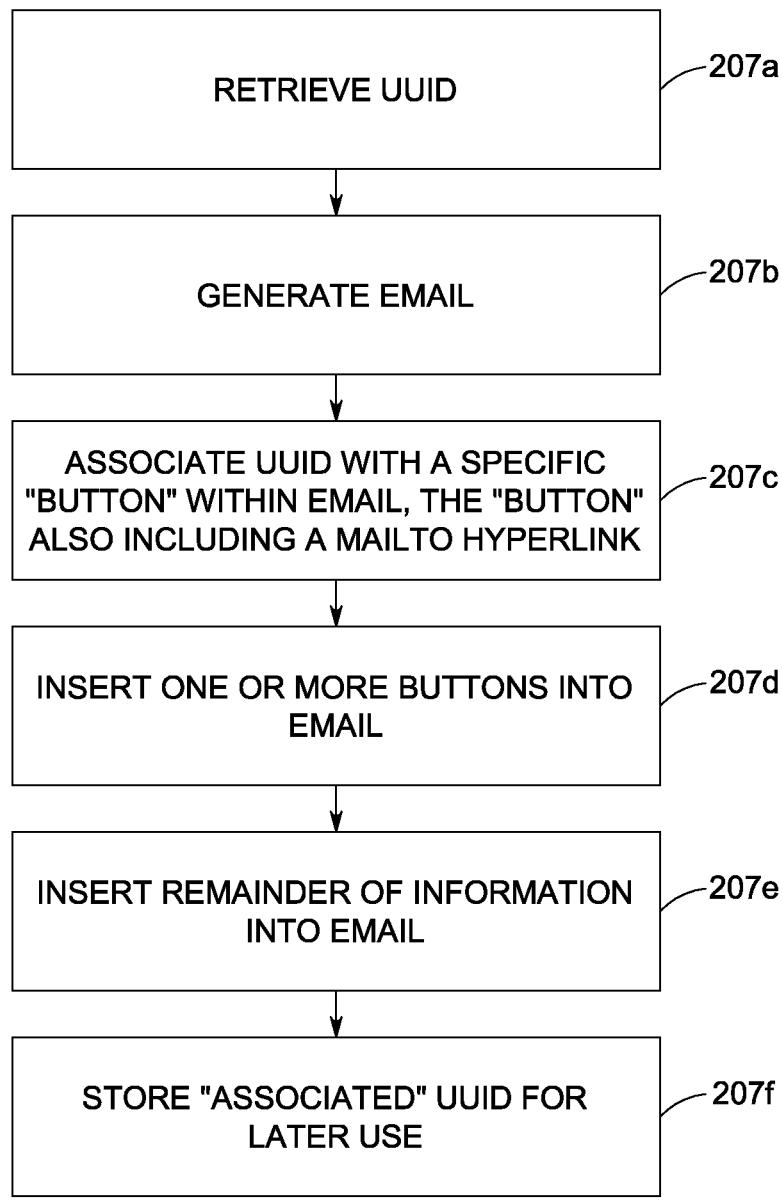
FIG. 9 shows a method for associating a UUID with a specific link within an email.

It would be understood by those of skill in the art that although the steps 207a-f of FIG. 9 are shown in a particular order, some of the steps may be changed or eliminated. For example, when an email is generated 207b, it may include all of the relevant information, and therefore step 207e may be unnecessary. Additionally, steps 207c and 207d may be performed simultaneously by associating the UUID with a button as it is being embedded in an email. These changes will not depart from the spirit or scope of the present invention.

Referring back to FIG. 6, the email 340 is then transmitted 210 from the system 100 to the customer client device 120.

The customer client device 120 receives 212 the email 340, and the user is allowed to review the email 340 and make a selection 214 of one or more of the buttons 320a-e, 322a-e.

The selection 214 of one or more of the buttons 320a-e, 322a-e by the user causes the customer client device 120 to generate 216 a return email which includes the UUIDs associated with the one or more selected buttons 320a-e, 322a-e. The return email including the UUID(s) is then transmitted 218 from the customer client device 120 to the system 100. It should be noted by those of skill in the art that although the return email is shown being transmitted 218 back to the system 100, it may also be sent to a third party site for processing without departing from the spirit and scope of the present invention.

The system 100 (or the third party site) receives 220 the return email and parses 224 the return email for the one or more UUIDs, and optionally other important authentication information, as will be explained in greater detail hereinafter. Once the UUIDs and the optional authentication information is parsed 224 from the return email, security qualification on the UUIDs is performed 226.

Figure 10:
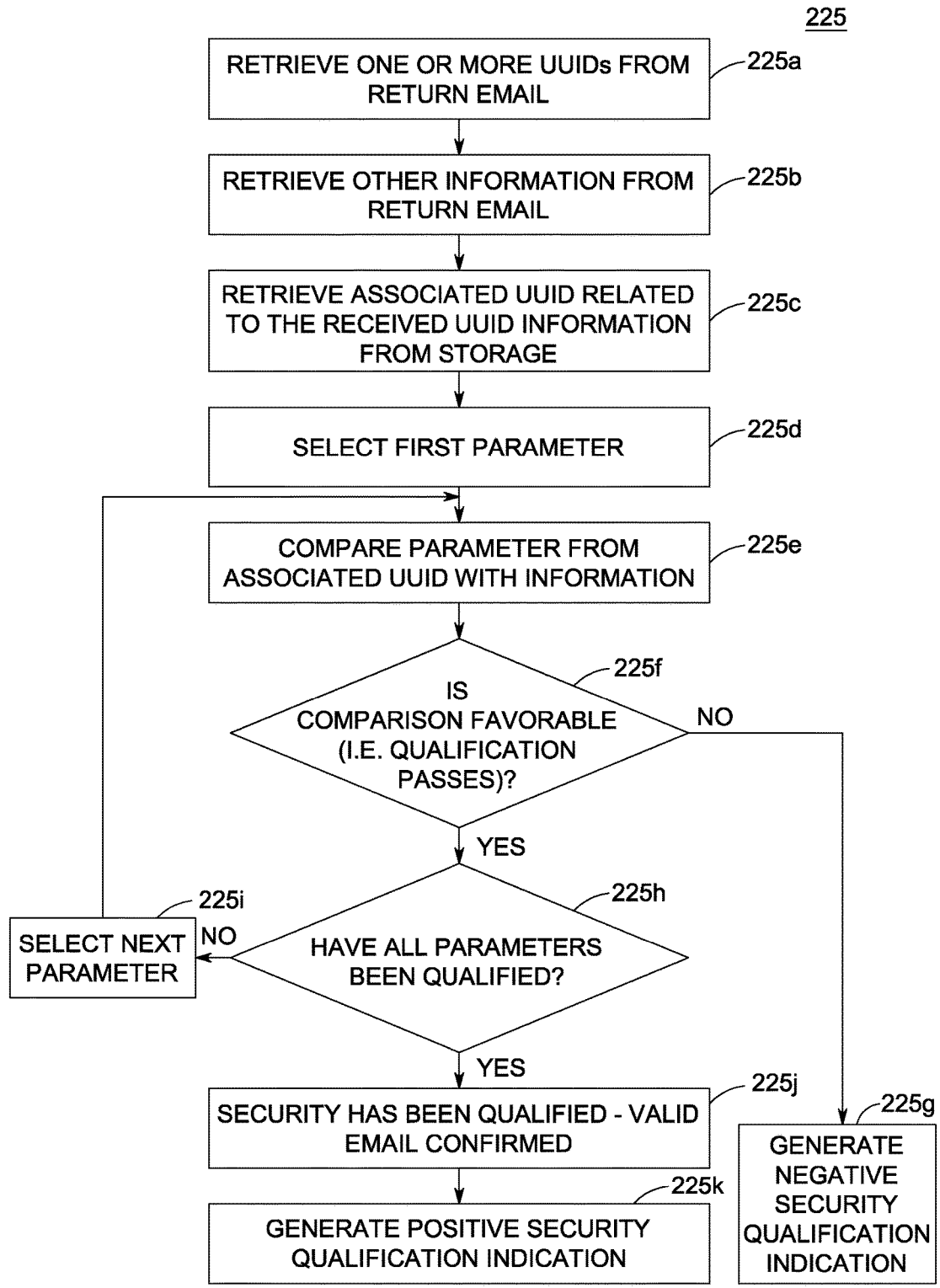
FIG. 10 shows a method of parsing an incoming email in order to detect a valid UUID.

The process 225 of steps 224 and 226 will be described in greater detail with respect to FIG. 10.

The return email is parsed 225a for the one or more UUIDs that are embedded in the return email, and is also optionally parsed for other important authentication information 225b.

Those of skill in the art would understand that steps 225a and 225b may be performed in opposite order, or may be performed together. The associated authentication control packet 300 is retrieved 225c and one of the parameters (included in fields 302-$318_N$) is selected 225d and compared 225f to the information parsed from the return email. In a simplest example, the UUID that is parsed 225a from the return email is compared 225e to the UUID 302 in the authentication control packet 300 to determine if they match. If the match is not favorable, a negative security qualification indication is generated 225g. In essence, that selected parameter 302 is indicated as failed.

It should be understood that the process 225 may be terminated after only a single failure, or a certain threshold of positive matches for the selected parameters may be set. In another alternative, the parameters may be selectively weighted, and the process 225 may be terminated or deemed a success based upon a certain threshold being missed or met, respectively.

Referring to step 225h, if not all of the parameters have been reviewed, the next parameter is selected 225i and the process continues at step 225e. If all of the parameters have been reviewed and qualified 225h, a valid email has been confirmed 225j and a positive security qualification indication is generated 225k.

Referring back to FIG. 6, the transaction is continued or denied 228 based upon the success or failure of the security qualifications determined in step 225. This step 228 is shown in greater detail with reference to FIG. 11.

Figure 11:
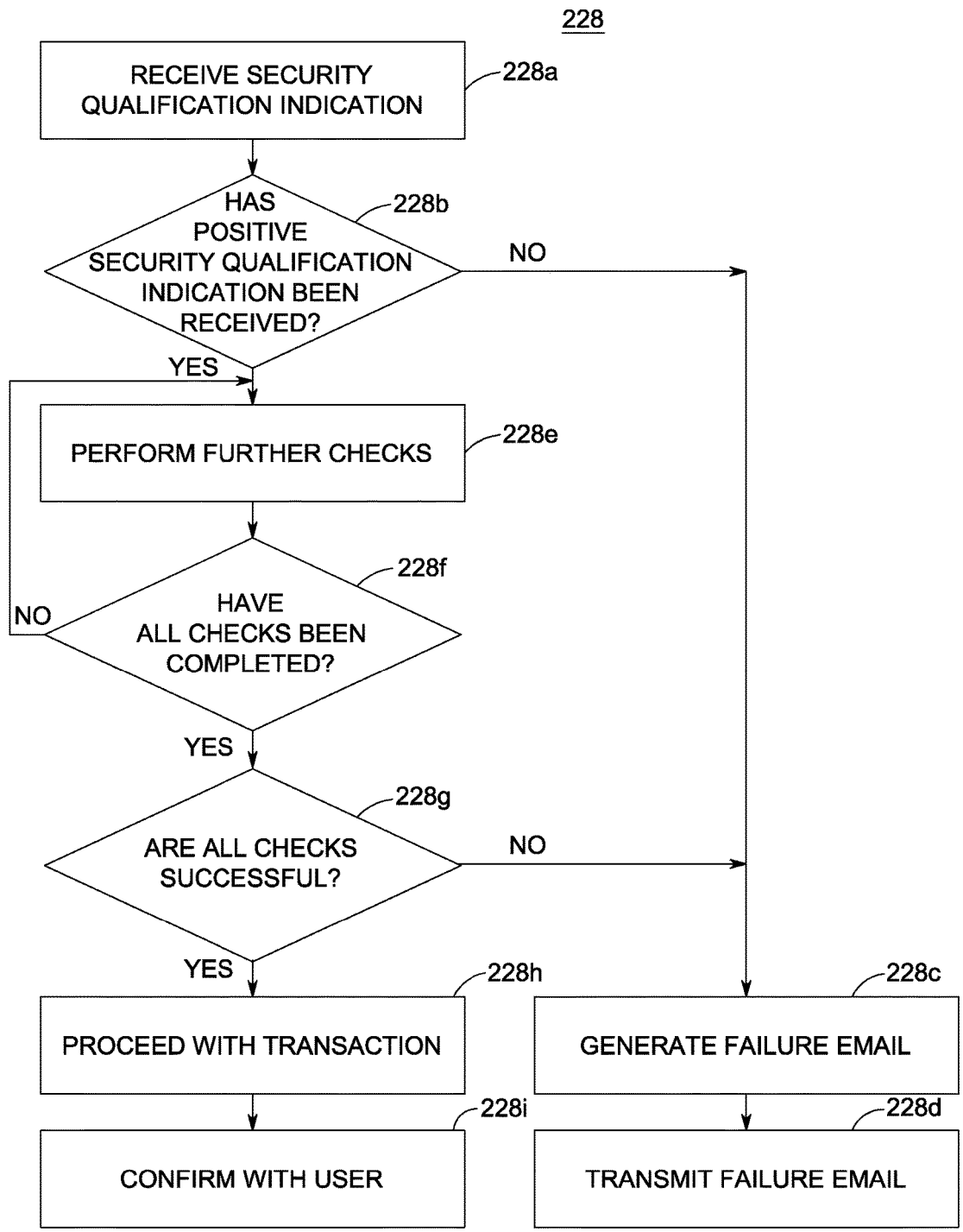
FIG. 11 shows a method for performing security qualifications on an incoming email.

Referring to FIG. 11, one or more security qualification indications are received 228a, and it is determined 228b whether an "overall" positive indication has been received as determined at step 225k, whether it is by threshold, weighting, or some other method. If this indication is negative, a failure email is generated 228c and transmitted 228d.

This failure email may not be the end of the process. For example, the failure email may be an opportunity for the vendor to gain another user, if a user other than the intended user sent in a return email. Additionally, other security questions may be sent in the failure email in order to "rehabilitate" the rejected email.

Even if the positive security qualification has been determined at 228b, some vendors may require additional checks 228e. Additional checks are those additional security questions or handles that may be enacted by different organizations. This allows the security process to be tailored to the specific needs of an organization. If all checks have not been completed, step 228e is repeated. Once it has been determined 228f that all checks have been completed, it is determined whether all checks are successful 228g. Again, this step 228g may require all checks to be positive, may require a certain number or percentage of checks be completed, or may require that a certain "weight" be achieved in a weighting scheme, that applies more weights to certain checks than to others. If the checks are determined 228g to be successful the transaction proceeds 228h and a confirmation is sent 228i to the user.

If the checks are determined 228g to be unsuccessful, the transaction proceeds to generate 228c whereby a failure email is generated. This failure email is then sent to the user 228d.

Figure 12:
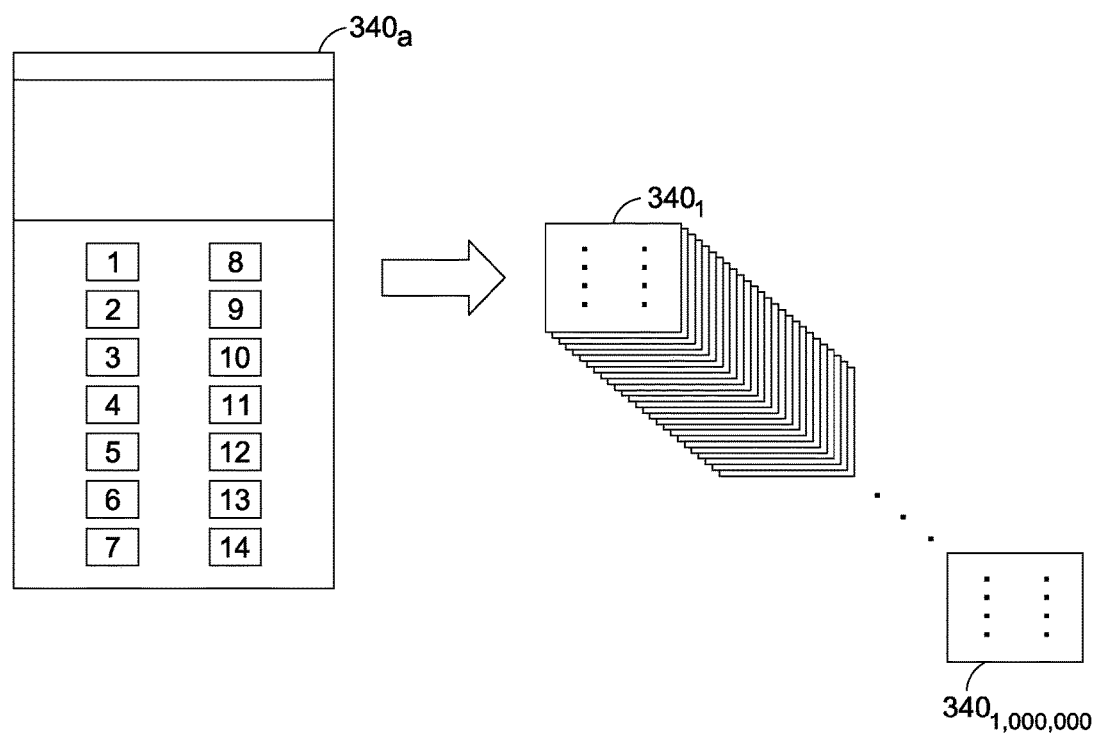
FIG. 12 graphically shows a plurality of emails, each having a plurality of buttons, each button of the plurality of buttons for the plurality of emails having a unique identifier.

Referring to FIG. 12, the result of the processes described hereinbefore are that each email 340 with a plurality of buttons is generated (i.e. 1-14), as is graphically represented on the left side of FIG. 12. Each button has a UUID embedded within it.

Additionally, as is graphically represented in one million emails $340_1$ through $340_{1,000,000}$ on the right side of FIG. 12, each separate button within each separate email has a unique UUID. Therefore, if each email has 14 different buttons, and one million emails are generated, then 14 million UUIDs are generated and embedded into the emails. This ensures that when a button is selected within an email, and the UUID is sent in a return email, the system 100 will know exactly which button from which user was selected. Along with the security qualifications, the present invention ensures not only identity, but also security.

In addition to, or as an alternative to, the features of these modules described above with reference to FIGS. 1-12, these modules may perform additional functionality described below with reference to remaining Figures.

Figure 13:
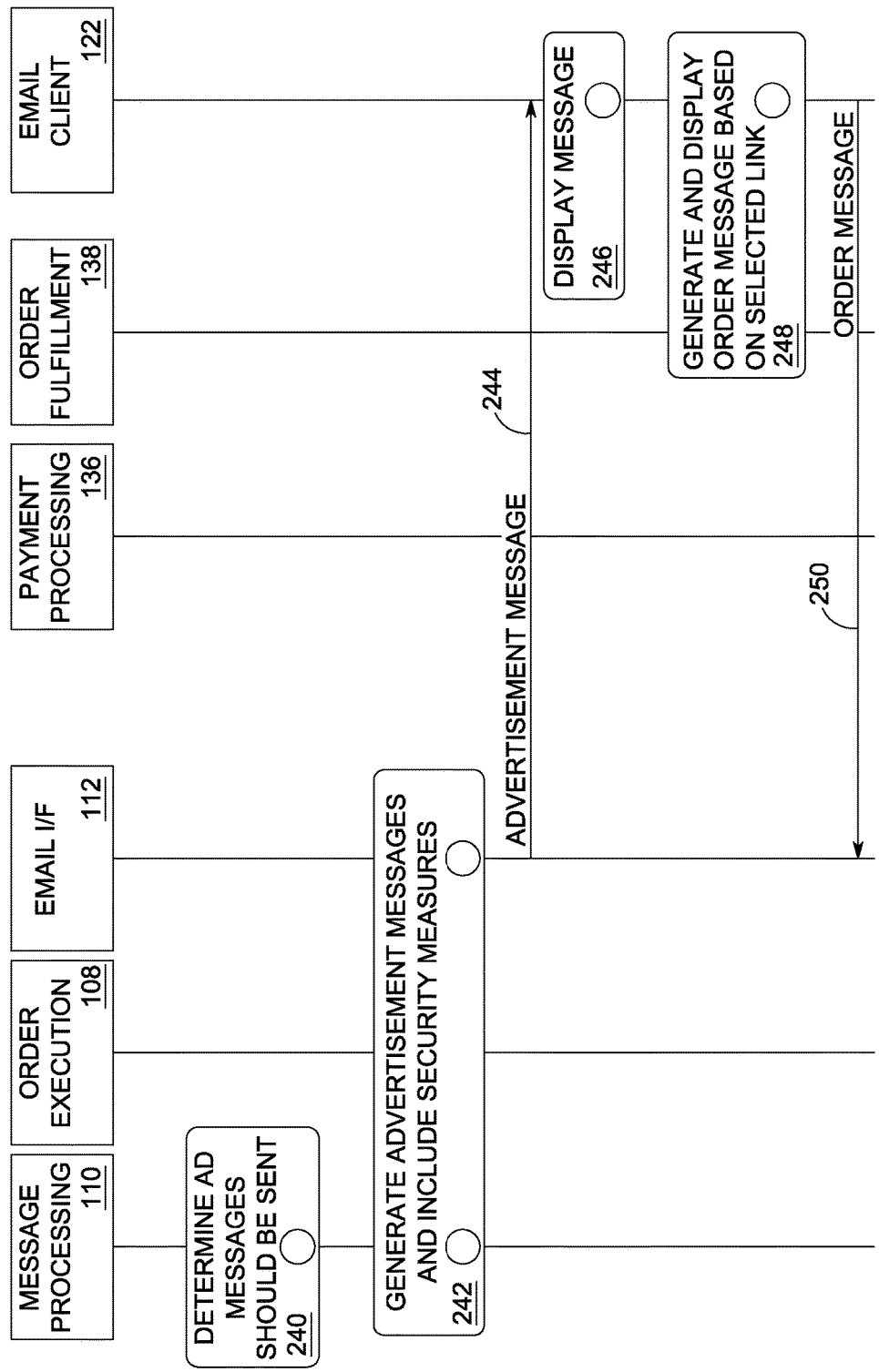
FIGS. 13 and 14 show a method for engaging in electronic commerce.
Figure 14:
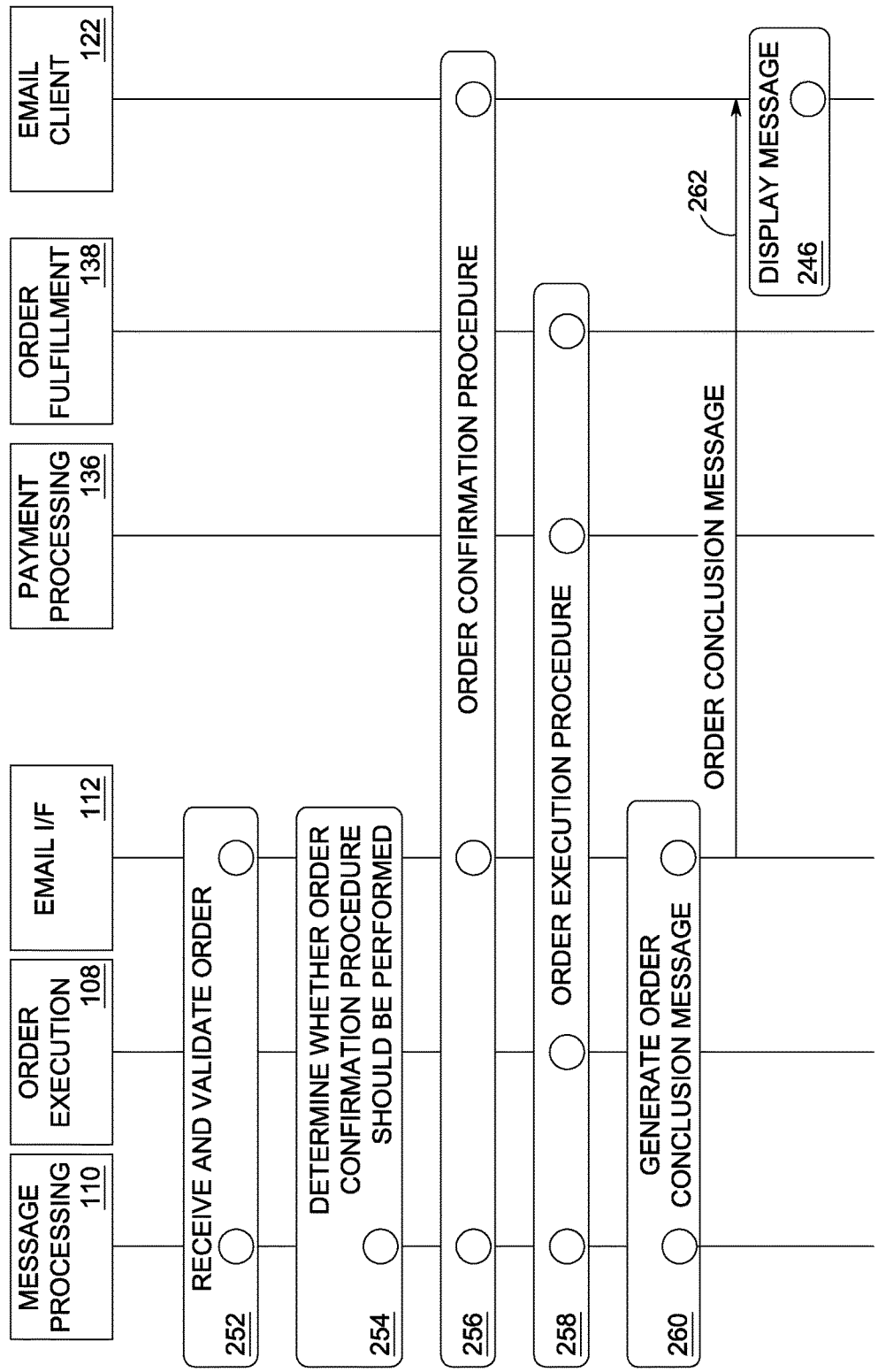

FIGS. 13 and 14 show an example method for email-based electronic commerce. FIGS. 13 and 14 also show components of the e-commerce system 100, including the message processing module 110, the order execution module 108, and the email interface module 112, the email client module 122 of the customer client device 120, as well as the payment processing system 136 and the vendor order fulfillment system 138.

The method of FIGS. 13 and 14 may begin with the message processing module 110 determining that an advertising email message should be sent by the e-commerce system 100 (step 240). This determination may be based on, for example, information provided by a user of the vendor client device 130 to account management module 102 in the e-commerce system 100 via the web browser module 134 in the vendor client device 130. This information may include, for example, an instruction that indicates that the advertising email message should be sent. Alternatively or additionally, this information may include information that defines an email campaign. Information that defines an email campaign may include information that describes the format and contents of the advertising email message. For example, the information may indicate the products or donations that should be indicated in the advertising email message, the quantities in which they may be bought, prices for the products or donations, and/or other information. Alternatively or additionally, in an instance where the advertising message is a solicitation for a donation to a non-profit organization, this information may describe amounts of suggested donations. Information that defines the email campaign may also include parameters that define customers to whom the advertising emails should be sent. For example, a campaign may be defined such that the advertising emails will be sent only to users who have not purchased an item from the vendor since a given time period.

The message processing module 110 and/or the email interface module 112 may then generate the advertising email messages that are to be transmitted according to the information that describes the email campaign (step 242). This may include, for example, the message processing module 110 obtaining information from the e-commerce database 106 via the database module 104 that indicates a list of email addresses and other identifying information (such as customer identifiers) for customers that are the intended recipients of the email messages as described in the email campaign information. The advertising email messages may indicate that they are being sent by one of the email accounts used by the e-commerce system 100. This may also include the message processing module 110 assigning an email campaign identifier that is associated with this email campaign.

Further, the email messages generated by the message processing module 110 may include one or more mailto hyperlinks that define the contents of email messages that are generated when the mailto hyperlinks are selected. For example, and as will be described in further detail below, the message processing module 110 may generate the contents of the mailto hyperlinks such that the hyperlinks include information that identifies products that are being sold by a vendor. When the mailto hyperlinks are selected, new email messages are generated that may be used to initiate orders to purchase the identified products.

Further, the email messages generated by the message processing module 110 may include one or more security features generated by the security module 109 within the mailto hyperlinks that define the identity of each button within the email. The security features may include the parameters as discussed with reference to FIG. 8.

Mailto hyperlinks in the advertising email messages may include one or any combination of the following fields: a "mailto:" and/or "to" field that indicate one or more email addresses of recipients of the new message; a "Copy To" or "CC" field that indicates one or more email addresses of recipients to whom a copy of the new message should be sent; a "Blind Copy To" or "BCC" field that indicates one or more email addresses of recipients to whom a blind copy of the new message should be sent; a field that indicates the subject of the new message; and a field that indicates the body of the new message. The mailto hyperlinks may be defined according to the format described in Internet Engineering Task Force (IETF) RFC2368, which is incorporated by reference as if fully set forth herein.

The email interface module 112 may then transmit one of the generated advertising email messages to the email client module 122 (step 244). The email message may be received by the email client module 122 and displayed by the email client module 122 (step 246).

Referring now to both FIG. 13 and FIG. 7, FIG. 7 shows an email display window 340 that may be used by the email client module 122 to display a first example email message from the message processing module 110 (step 246). The email display window 340 may include a Reply button 342, a control area 344, and a message body area 346. The control area 344 may display control and/or header information associated with the email message, such as the email addresses of the sender and recipient of the message. According to this example, the control area 344 shows that the sender of the message has the email address "sales@company.com." This is an email address that may be associated with an account used by the e-commerce system 100 for the communication of email messages. Further to this example, the control area 344 shows that the email address of the example recipient of the message (John Smith) is "john.smith@customer.com." The control area 344 may also display information such as a subject of the email message and the time the email message was sent. The Reply button 342 may respond to user input to generate a new display element (not depicted) to respond to the email message.

The message body area 346 may display the body of the email message. As shown in FIG. 7, the message body area 346 may display an example email message that shows information related to two example products (Wine One and Wine Two) that are being offered for sale by an example vendor (The Wine Shop). The message body area 346 includes a picture of a bottle of each type of wine, as well as the price for a bottle of each type of wine. The message body area 346 also includes, under the picture of the bottle of Wine One, a number of mailto hyperlinks, such as the "1 Bottle," "2 Bottles," "3 Bottles", "6 Bottles," and "1 Case (10% Discount)" links. The message body area 346 also includes similar links under the picture of the bottle of Wine Two. These links may be defined according to the mailto URI scheme or other appropriate format, and each may describe a new email message that may be generated by the email client module 122 when that link is selected.

The "1 Bottle" hyperlink 320*a* beneath the picture of the Wine One bottle may include information that describes an email message that, if received by the e-commerce system 100, will indicate to the e-commerce system 100 that John Smith would like to purchase one bottle of Wine One. As a further example, Wine One may have a product identifier of "0005," and John Smith may have a customer identifier of "0777." According to this example, the "1 Bottle" hyperlink 320*a* may describe an email message that is addressed to an email account that is associated with the e-commerce system 100, and that includes a message body that includes the identifier for John Smith ("0777"), an identifier of the selected product ("0005"), and an identifier of the quantity that John Smith would like to order (in this example, a single bottle). Alternatively or additionally, the email message described by the hyperlink may include information such as text that describes the order, an identifier of the vendor (in this example, The Wine Shop), an email campaign identifier, and/or other information. Similarly, the "2 Bottles" hyperlink 320*b* beneath the picture of the Wine One bottle may include information that describes an email message that, if received by the e-commerce system 100, will indicate to the e-commerce system 100 that John Smith would like to purchase two bottles of Wine One. According to this example, the "2 Bottles" hyperlink 320*b* may be defined as follows:

```
<a href="mailto:sales@company.com?
    subject=Purchase%20from%20Wine%20Shop%20&
    body=You%20have%20created%20an%20order%20for%20two%20bottles
%20of%20Wine%20One.%20Press%20the%20Send%20button%20to%20complete
%20the%20order.%0A%0AProductID0005%20QualifierNA%20Qty0002%20Customer
ID0777%20CampaignID0003"
    target="_blank">2 Bottles</a>
```

Similarly, the "3 Bottles," "6 Bottles," and "1 Case (10% Discount)" hyperlinks 320*c-e* beneath the picture of the Wine One bottle indicate corresponding information for three bottles, six bottles, and one case of bottles, respectively. Additionally, the "1 Bottle," "2 Bottles," "3 Bottles," "6 Bottles," and "1 Case (10% Discount)" hyperlinks 320*a-e* under the Wine Two bottle indicate corresponding information for Wine Two as that described above with respect to the mailto hyperlinks relating to Wine One.

The email client module 122 may receive a user input that indicates that one of the hyperlinks displayed in the message body area 346 is selected. The user input may be, for example, a mouse click, keyboard input, or any other type of input that indicates that a hyperlink is selected. Referring again to FIG. 13, the email client module 122 may, in response to this user input, generate and display an order email message as specified by the selected hyperlink (step 248).

Figure 15:
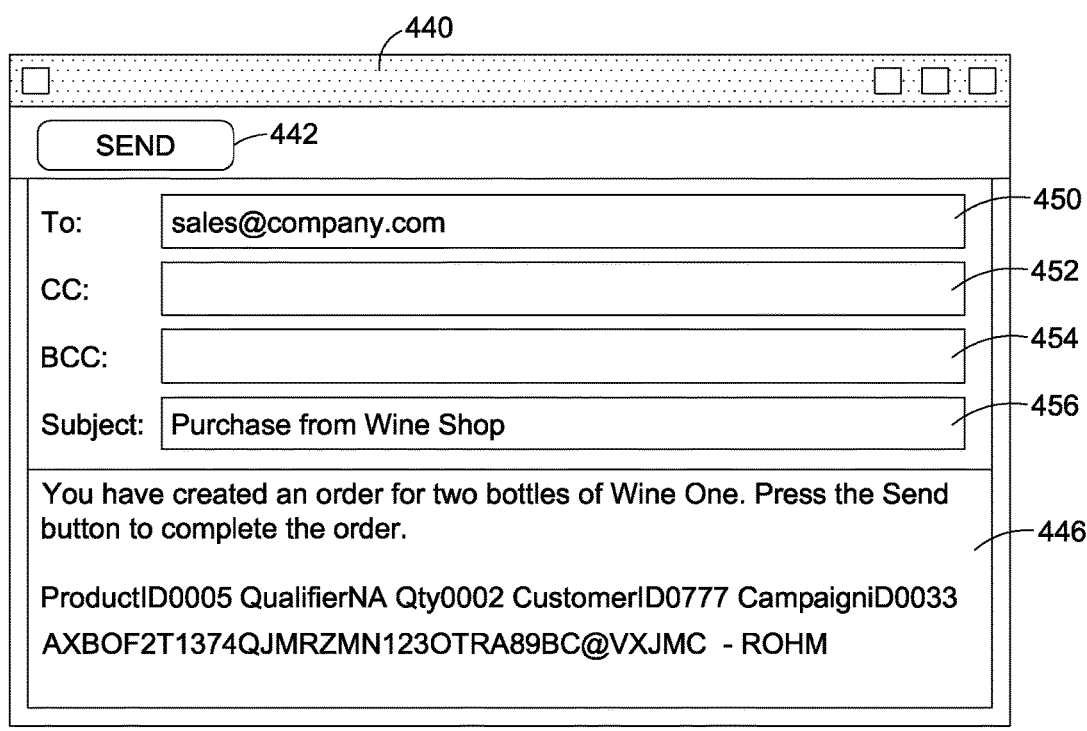
FIG. 15 shows an email message for placing an order.

Referring now to FIG. 13 and FIG. 15, FIG. 15 shows an example message composition window 440 that may be displayed in response to a selection of a hyperlink from the message body area 346 of the email display window 340 of FIG. 7 (step 248). The message composition window 440 of FIG. 15 may include a Send button 442, a To area 450, a CC area 452, a BCC area 454, a Subject area 456, and a message body area 446.

The Send button 442 in the message composition window 440 of FIG. 15 may be responsive to input from a user such as a mouse click, keyboard input, or any other type of input. The different areas 446, 450, 452, 454, 456 in the message composition window 440 display different portions of an email message. For example, the To area 450 includes text that indicates email addresses to which the email message is addressed, while the message body area 446 displays the contents of the body of the email message. Each or any of these different areas 446, 450, 452, 454, 456 may be editable based on user input. Changes to the contents of these areas 446, 450, 452, 454, 456 may change the corresponding portion of the email message.

FIG. 15 shows an example wherein the "2 Bottles" hyperlink 320*b* beneath the picture of the Wine One and described above with reference to FIG. 7 is selected. The To area 450 indicates that the message is addressed to sales@company.com. The Subject area 456 indicates that the subject of the message is "Purchase from Wine Shop." The CC area 452 and BCC area 454 are blank. Continuing the example of FIG. 7, Wine One product has a product identifier of "0005" and John Smith has a customer identifier of "0777." Accordingly, the message body area 446 includes the text "ProductID0005" and "CustomerID0777." To indicate that the user has selected the purchase of two bottles, the message body area 446 includes the text "Qty0002." Further, the message body area 446 includes the text "CampaignID0033," indicating that the order is associated with an email campaign with an identifier of "0033."

Alternatively, or in addition to the message body area having the text "ProductID0005," "CustomerID0777," "Qty0002," and "CampaignID0033," which clearly refer to what is being selected and include proprietary information (such as customer ID), the message body area 446 may include a UUID of the selected button or hyperlink. As shown, the UUID provides much more security, since it random, and users cannot tamper with it as they could with the identifiable text information.

In an instance where a different hyperlink from the message body area 346 of FIG. 7 is selected, the display areas 446, 450, 452, 454, 456 in the message composition window 440 may include contents specified by the selected different hyperlink. For example, in an instance where a hyperlink related to Wine Two is selected (322*a-e*), the message body area would not include the text "ProductID0005," but would include text that indicates the corresponding identifier for Wine Two. Alternatively, a different UUID will be included.

Figure 16:
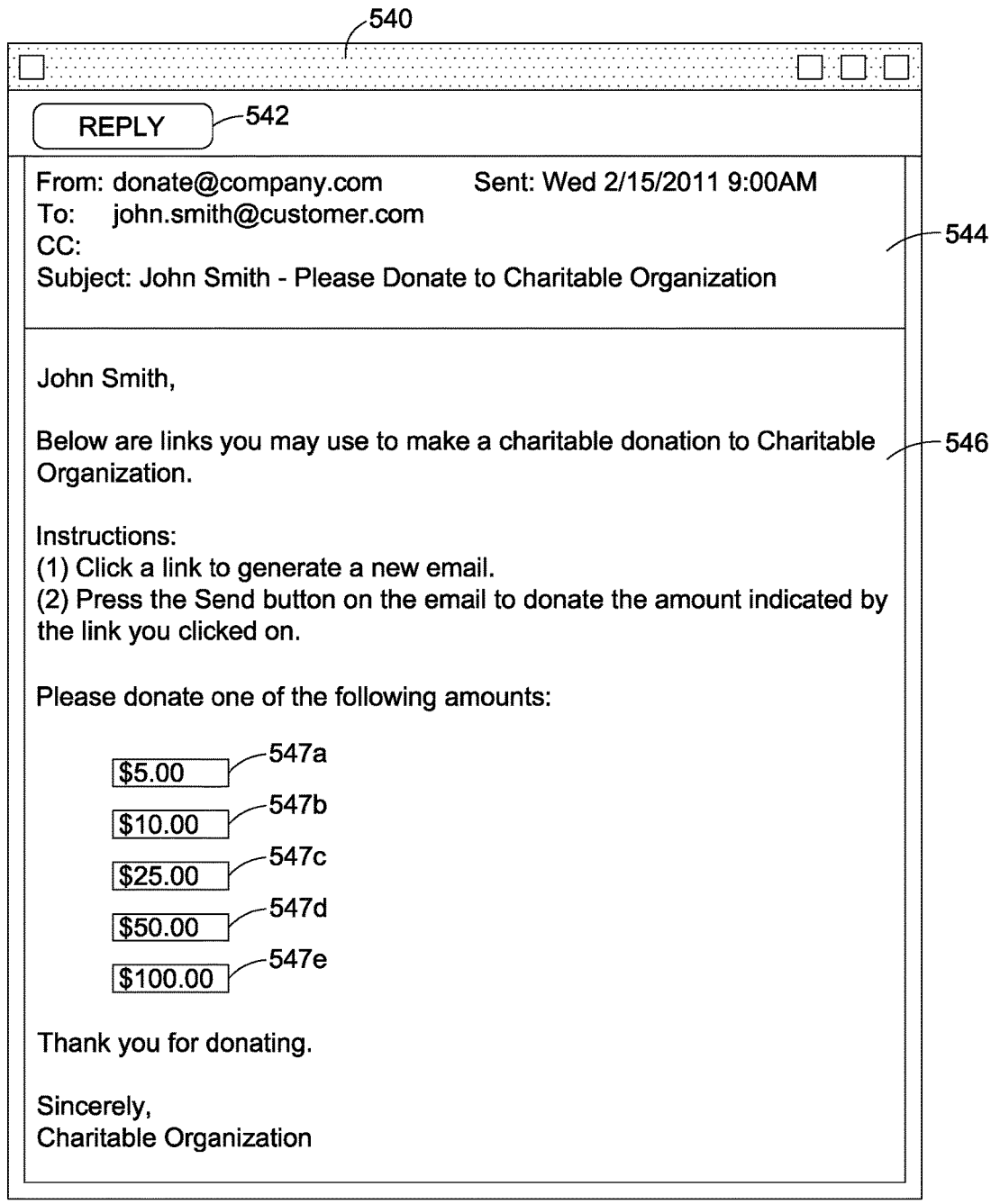
FIG. 16 shows an advertisement email message that solicits a donation for a non-profit organization.

Referring now to both FIG. 13 and FIG. 16, FIG. 16 shows an email display window 540 that may be used by the email client module 122 to display a second example email message from the message processing module 110 (step 246). The email display window 540 includes a Reply button 542, a control area 544, and a message body area 546. These display elements 542, 544, 546 may possess similar and/or analogous characteristics and/or perform similar functionality as corresponding display elements 342, 344, 346 in the email display window 340 of FIG. 7. According to the example of FIG. 16, the control area 544 shows that the sender of the message has the email address "donate@company.com." This is an email address that may be associated with an account used by the e-commerce system 100 for the communication of email messages. Further to this example, the control area 544 shows that the email address of the example recipient of the message (John Smith) is "john.smith@customer.com."

As shown in FIG. 16, the message body area 546 of the email display window 540 may display an example email message that shows information related the solicitation of donations for an example non-profit organization ("Charitable Organization"). The message body area 546 also includes a plurality of buttons 547a-e or mailto hyperlinks, such as the "$5.00," "$10.00," "$25.00," "$50.00," and "$100.00" hyperlinks. These hyperlinks may possess similar and/or analogous characteristics, and/or include similar and/or analogous information, as the mailto hyperlinks described above with reference to FIG. 7.

Each button 547a-e has an associated UUID. The "$5.00" hyperlink 547a describes an email message that, if received by the e-commerce system 100, will indicate to the e-commerce system 100 that John Smith would like to donate $5.00 to Charitable Organization. Similarly, the "$10.00," "$25.00," "$50.00, and "$100.00" hyperlinks 547b-e describe email messages with corresponding information for $10.00, $25.00, $50.00, and $100.00 donations, respectively.

The email client module 122 may receive a user input that indicates that one of the hyperlinks displayed in the message body area 546 is selected. Referring again to FIG. 13, the email client module 122 may, in response to this user input, generate and display an order email message as specified by the selected hyperlink (step 248).

Figure 17:
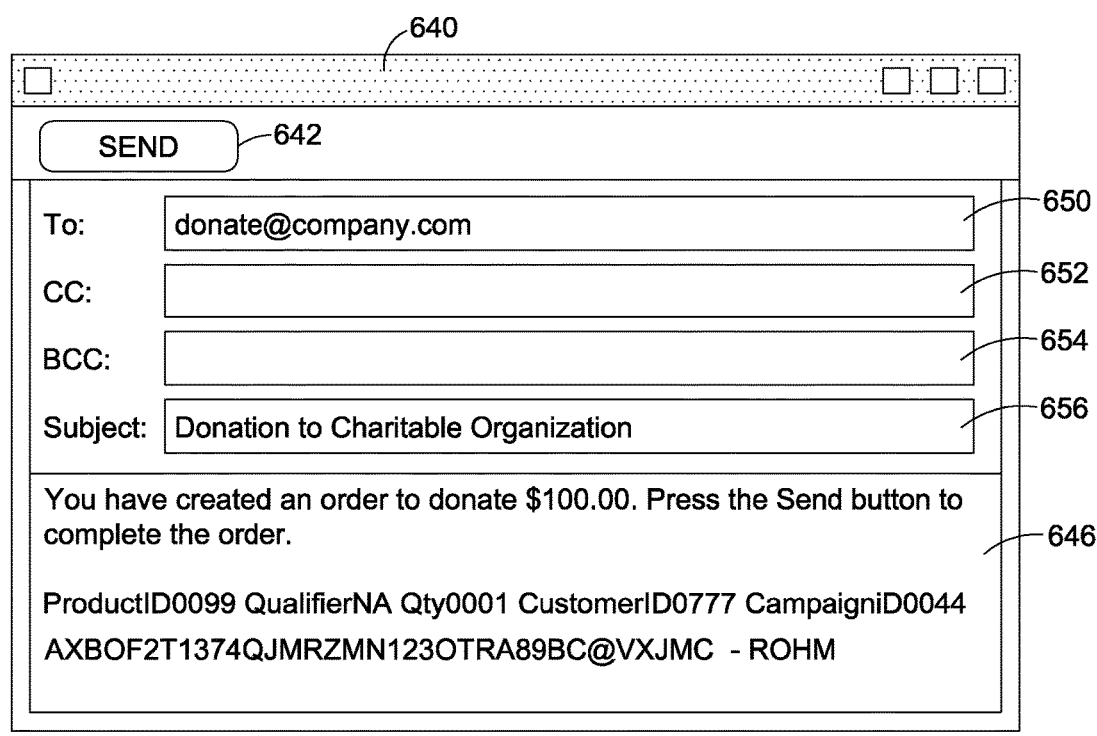
FIG. 17 shows an email message for making a donation to a non-profit organization.

Referring now to FIG. 13, FIG. 16, and FIG. 17, FIG. 17 shows an example message composition window 640 that may be displayed in response to a selection of a hyperlink from the message body area 546 of the email display window 540 of FIG. 16 (step 248). The message composition window 640 of FIG. 17 may include a Send button 642, a To area 650, a CC area 652, a BCC area 654, a Subject area 656, and a message body area 646. These display elements 642, 650, 652, 654, 656, 646 may possess similar and/or analogous characteristics and/or perform similar functionality as corresponding display elements 442, 450, 452, 454, 456, 446 in the message composition window 440 of FIG. 15.

FIG. 17 shows an example wherein the "$100.00" hyperlink 547e from the message body area 546 of the email display window 540 of FIG. 16 is selected. The To area 650 indicates that the message is addressed to donate@company.com. The Subject area 656 indicates that the subject of the message is "Donation to Charitable Organization." The CC area 652 and BCC area 654 are blank. According to this example, a donation of $100.00 to Charitable Organization has a product identifier of "0099," and John Smith has a customer identifier of "0777." Accordingly, the message body area 646 includes the text "ProductID0099" and "CustomerID0777." Further, the message body area 646 includes the text "CampaignID0044," indicating that the order is associated with an email campaign with an identifier of "0044."

Alternatively, or in addition to the message body area having the text "ProductID0099," "CustomerID0777," "Qty0001," and "CampaignID0044," which clearly refer to what is being selected and include proprietary information (such as customer ID), the message body area 446 may include a UUID of the selected button or hyperlink. As shown, the UUID provides much more security, since it random and users cannot tamper with it as they could with the identifiable text information.

Referring again to FIG. 13, the email client module 122 may send the generated order email message to the e-commerce system 100 (step 250). This may be performed in response to input from a user of the customer client device 120. As one example, the email client module 122 may, in response to a selection of the Send button 442 in the message composition window 440 of FIG. 17, transmit an order email message based on the contents of the fields 446, 450, 452, 454, 456 in the message composition window 440. As another example, the email client module 122 may, in response to a selection of the Send button 642 in the message composition window 640 of FIG. 17, transmit an order email message based on the contents of the fields 646, 650, 652, 654, 656 in the message composition window 640.

Referring now to FIG. 14, the email interface module 112 and the message processing module 110 may then receive the order email message (step 252). This may include, for example, the message processing module 110 periodically querying the email interface module 112 for information related to new messages received by the email interface module 112 for one or more of the email accounts used by the e-commerce system 100.

Further, the message processing module 110 may validate the contents of the order email message by determining if the message is formatted correctly and/or includes information that it should include. For example, the message processing module 110 may be configured to expect that the text of the body of the order email message should include information related to an order placed by a customer, such as an identifier of a customer that transmitted the message, a product identifier, an identifier that indicates a donation amount, an identifier of a vendor associated with the order, information that indicates a quantity associated with the order, a campaign identifier, and/or other information. In an instance where the message processing module 110 determines that the information included in the order email message is invalid (e.g., if one or more required pieces of information are missing and/or formatted incorrectly), the message processing module 110 may send one or more emails (not depicted) to the email address from which the order email message was received, indicating that the order email message could not be correctly processed.

Alternatively or additionally, the message processing module 110 may validate the contents of the order email message by determining whether it includes information that matches data stored in the e-commerce database 106. For example, the message processing module 110 may determine whether one or more identifiers (such as a customer identifier, product identifier, vendor identifier, or campaign identifier) in the message corresponds to one of the valid parameters $302\text{-}318_N$ in the e-commerce database 106. In an instance where the message processing module 110 determines that the information included in the order email message is invalid (e.g., if one or more of the parameter $302\text{-}318_N$ in the message are not valid), the message processing module 110 may send one or more emails (not depicted) to the email address from which the order email message was received, indicating that the order email message could not be correctly processed.

The message processing module 110 may then determine whether an order confirmation procedure should be performed (step 254). This may be based on, for example, a parameter related to the vendor with which the order corresponding to the order email message is associated. For example, a vendor might configure the e-commerce system 100 such that all orders for that vendor do or do not require an order confirmation before the orders are processed. This information may be provided to the account management module 102 in the e-commerce system 100 via, for example, the web browser module 134 in the vendor client device 130. The account management module 102 may store this information in the e-commerce database 106. To perform this determination, the message processing module 110 may determine which vendor to which the order pertains, based on a product identifier and/or vendor identifier include in the order email message. The message processing module 110 may then access the e-commerce database 106 via the database module 104 to determine whether this vendor has indicated whether an order confirmation is required before the order is processed.

Alternatively or additionally, the message processing module 110 may determine whether an order confirmation procedure should be performed based on the nature of the order (step 254). For example, the message processing module may be configured to determine that orders that do not require fulfillment of an order by a merchant (for example, orders that relate only to a donation or other pure exchange of funds) do not require an order confirmation procedure, while orders that relate to relate to the fulfillment of an order for tangible goods do require an order confirmation procedure.

In an instance where the message processing module 110 determines that an order confirmation procedure is required, the message processing module 110, email interface module 112, and the email client module 122 may perform an order confirmation procedure (step 256).

As one example, the order confirmation procedure (step 256) may include the transmission of one or more confirmation email messages (not shown) from the message processing module 110 to the email client module 122 that indicates that the order has been received. These confirmation email messages may be generated by the message processing module 110, and transmitted to the email client module 122 via the email interface module 112. One example of such a confirmation email message is shown in FIG. 10.

Figure 18:
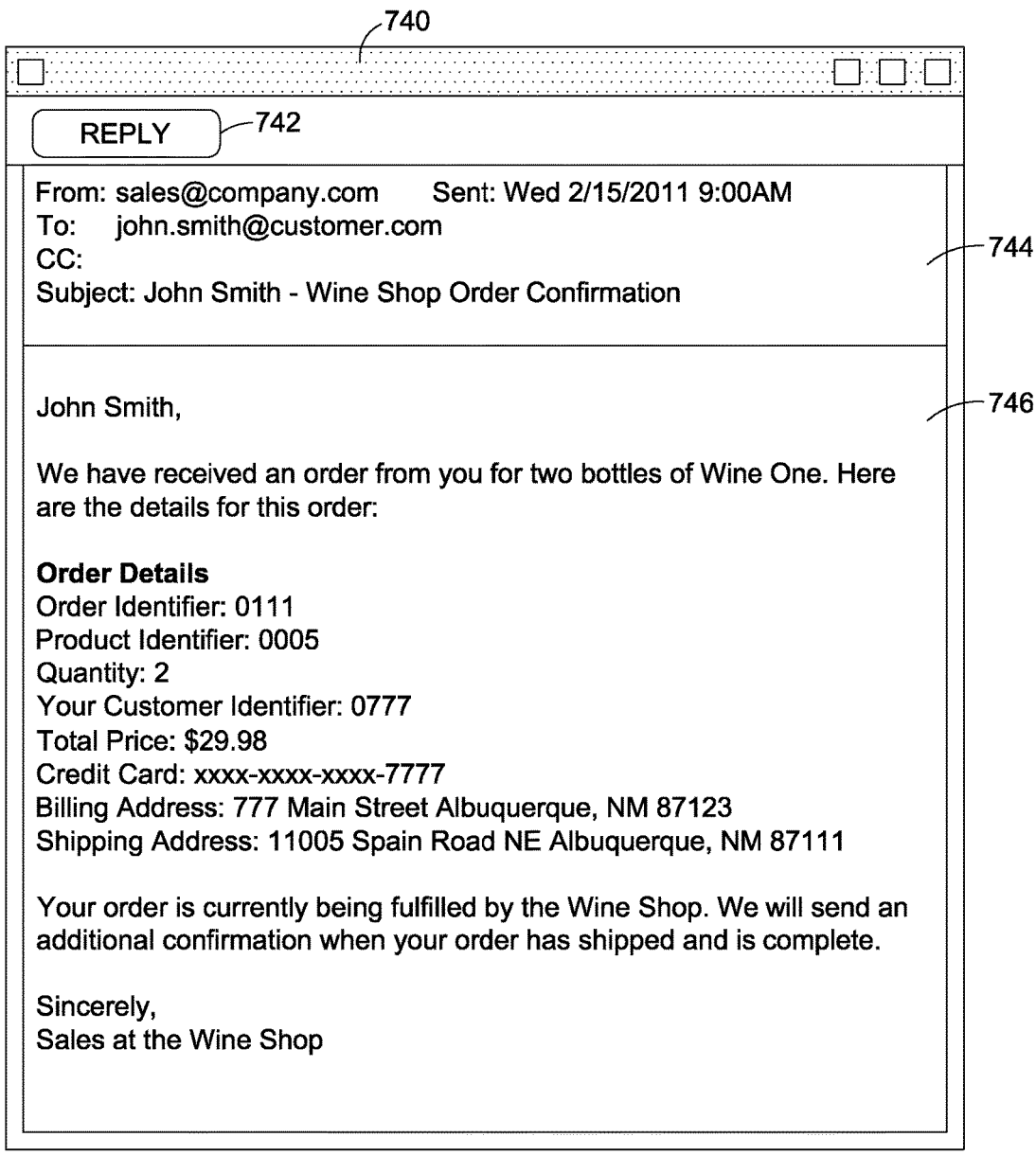
FIG. 18 shows a first order confirmation email message.

FIG. 18 shows an email display window 740 that may be used by the email client module 122 to display the example confirmation email message received from the message processing module 110. The email display window 740 includes a Reply button 742, a control area 744, and a message body area 746. These display elements 742, 744, 746 may possess similar and/or analogous characteristics and/or perform similar functionality as corresponding display elements 342, 344, 346 in the email display window 340 of FIG. 7.

Alternatively or additionally, during the order confirmation procedure (step 256), the message processing module 110 (in conjunction with the email interface module 112) may exchange one or more email messages with the email client 122, in order to determine whether the order should be canceled, or whether the order should be executed. In such an instance, the message processing module 110 and/or the order execution module 108 may determine, based on the exchange of email messages, whether the order should be executed.

Alternatively or additionally, the order confirmation procedure (step 256) may be, or may include any, or any combination of, the actions shown in FIG. 11, which is described in further detail below.

In an instance where the message processing module 110 and/or the order execution module 108 make a determination that the order should be executed, or in an instance where an order confirmation procedure is not performed, and/or in any other appropriate context, an order execution procedure may be performed, to complete the order indicated in the order email message (step 258). The message processing module 110, the order execution module 108, the payment processing module 136, and/or the vendor order fulfillment system 138 may participate in the order execution procedure (step 258).

The order execution procedure may include, for example, the order execution module 108 accessing credit card account and/or other financial information related to the customer that is stored in the e-commerce database 106 via the database module 104. This may also include the order execution module accessing bank account and/or other financial information related to the vendor that is stored in the e-commerce database 106 via the database module. The order execution module 108 may transmit the financial information related to both the customer and the vendor to the payment processing system 136, indicating that a payment should be made from the account of the customer to the account of the vendor.

Alternatively or additionally, an example order execution procedure may include one or more of the following actions: the order execution module 108 may access the order email message, which may include an identifier of the customer and a donation identifier/product identifier. Based on the donation identifier, the order execution module 108 may determine the non-profit organization to which the donation indicated in the order email message is intended. Further, the order execution module 108 may determine, based on the donation identifier, the amount to be donated. The order execution module 108 may determine the non-profit organization to which the donation indicated in the order email message is intended and the amount to be donated by, for example, querying the e-commerce database 106 (via the database module 104). Further, the order execution module 108 may perform a query of the e-commerce database 106 (via the database module 104) to obtain financial information for the customer and the non-profit organization.

The query to the e-commerce database 106 for the customer's financial information may include the identifier of the customer, and the response to the query may be the customer's financial information. Similarly, the query to the e-commerce database 106 may include the identifier of the vendor, and the response to the query may be the vendor's financial information.

The financial information for the customer may include, for example, credit card information (such as a credit card number and expiration date), and/or other information related to a bank account and/or other type of financial accounts (such as an e-Payment account). The financial information for the vendor may include information related to a bank account and/or other types of financial account (such as an e-Payment account) held by the vendor.

The order execution module 108 may transmit the financial information related to both the customer and the vendor to the payment processing system 136. As one example, the transmitted financial information may include an account number of the vendor and the credit card number and expiration date for a credit card account held by the customer, and the transmitted financial information may indicate that payment should be made to the to the identified account of the vendor from the credit card account of the customer for the amount indicated in the order email message.

Alternatively or additionally, the order execution procedure may include the order execution module 108 sending one or more messages to the vendor order fulfillment system 138 related to the order. For example, the order execution module 108 may send one or more messages to the vendor order fulfillment system 138 that indicate information such as the shipping address of the customer, an identifier of the items being ordered, a quantity of the items being ordered, and/or other information. Additionally, the vendor order fulfillment system 138 may communicate one or more messages to the order execution module 108 that indicate status updates with respect to fulfillment of the order. For example, the vendor order fulfillment system 138 may send one or more messages to the order execution module 108 that indicate milestones in the fulfillment of the order (e.g., that the goods involved in the order have shipped), and/or that fulfillment of the order is complete.

Alternatively or additionally, the order execution procedure may be or include any or any combination of the actions shown in FIG. 23, which is described in further detail below.

The message processing module 110 and/or the email interface module 112 may then generate an order conclusion email message (step 260). The order conclusion email message may indicate, for example, that the order was successfully completed, whether an error occurred that prevented successful completion of the order, that the order was canceled, and/or other information. The email interface module 112 may then transmit the order conclusion email message to the email client 122 (step 262) in the customer client device 120. The email client 122 may then receive and display the order conclusion email message (step 264). The email client 122 may display the order conclusion email message in an email display window (not depicted), with similar and/or analogous characteristics to the email display window 740 described above with reference to FIG. 18.

Figure 19:
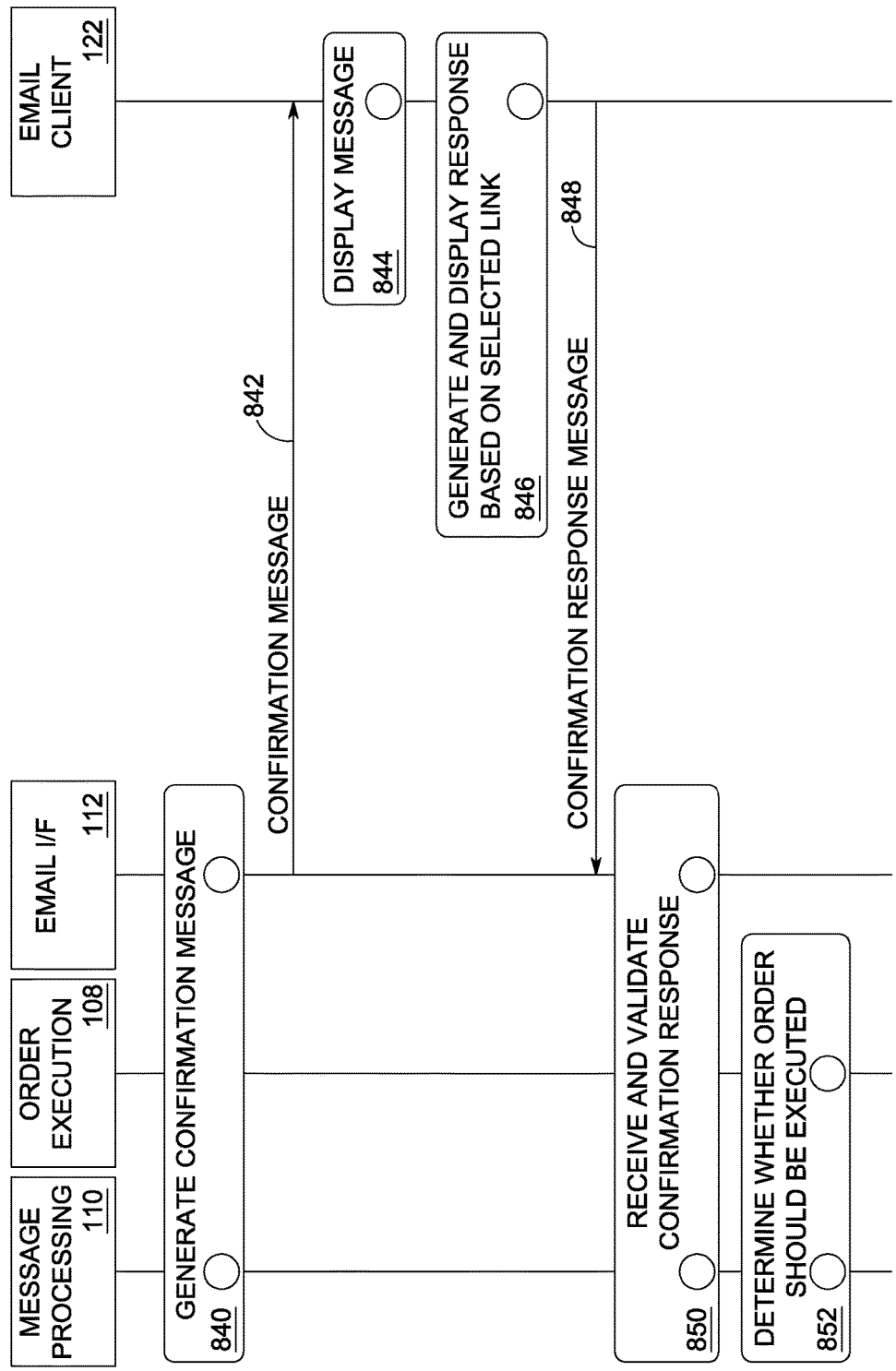
FIG. 19 shows an example order confirmation method.

FIG. 19 shows an example order confirmation method that may be implemented. FIG. 19 shows components of the e-commerce system 100, including the message processing module 110, the order execution module 108, and the email interface module 112. FIG. 19 also shows the email client module 122 of the customer client device 120.

The method of FIG. 19 may begin with the message processing module 110 and/or the email interface module 112 generating a confirmation email message (step 840). The confirmation email message may include information that indicates that an order has been placed, and may invite the user of the email client module 122 to provide input as to whether the order should be completed or not. As will be described in further detail below, the confirmation email message may include one or more mailto hyperlinks that describe a confirmation response email message that indicates whether the order should be completed or not.

Generating the confirmation email message (step 840) may also include determining the email address to which the confirmation email message should be sent. As described above with reference to FIG. 5, the e-commerce database 106 may store information that includes a customer identifier and an email address for each customer. According to a first approach for determining the email address to which the confirmation email message should be sent, the message processing module 110 may determine the customer identifier associated with the order that is being confirmed. The message processing module 110 may then obtain from the e-commerce database 106 (via the database module 104) the email address that is stored in the database that is associated with the customer identifier. According to this approach, the message processing module 110 may generate the confirmation email message such that it is addressed to the email address that is stored as associated with the customer identifier. According to this approach, it is possible that the email address from which the order email message was originally sent (as one example, as described above with respect to step 250 of FIG. 13) will be different from the address to which the confirmation email message is sent. According to a second approach, the message processing module 110 may generate the confirmation email message, such that it is addressed to the same email address from which the order email message was originally sent.

The email interface module 112 may transmit the confirmation email message to the email client module 122 (step 842). The confirmation email message may be received by the email client module 122, and displayed by the email client module 122 (step 844).

Figure 20:
FIG. 20 shows a second order confirmation email message.

Referring now to both FIG. 19 and FIG. 20, FIG. 20 shows an email display window 940 that may be used by the email client module 122 to display an example confirmation email message (step 844). The email display window 940 includes a Reply button 942, a control area 944, and a message body area 946. These display elements 942, 944, 946 may possess similar and/or analogous characteristics and/or perform similar functionality as corresponding display elements 342, 344, 346 in the email display window 340 of FIG. 7. According to the example of FIG. 20, the control area 944 shows that the sender of the message has the email address "sales@company.com." This is an email address that may be associated with an account used by the e-commerce system 100 for the communication of email messages. Further to this example, the control area 944 shows that the email address of the recipient of the message (John Smith) is "john.smith@customer.com."

As shown in FIG. 20, the message body area 946 may include information that describes the order that is being confirmed. The message body area also includes mailto hyperlinks, such as the "Confirm Order" and "Cancel Order" links. The "Confirm Order" hyperlink describes an email message that, if received by the e-commerce system 100, will indicate to the e-commerce system 100 that John Smith would like to proceed with the order indicated by the example confirmation email message. The "Cancel Order" hyperlink describes an email message that, if received by the e-commerce system 100, will indicate to the e-commerce system 100 that John Smith would like to cancel the order indicated by the example confirmation email message.

The email client module 122 may receive a user input that indicates that one of the hyperlinks displayed in the message body area 946 is selected. The user input may be, for example, a mouse click, keyboard input, or any other type of input that indicates that a hyperlink is selected. Referring again to FIG. 19, the email client module 122 may, in response to this user input, generate and display a confirmation response email message as specified by the selected hyperlink (step 846).

Figure 21:
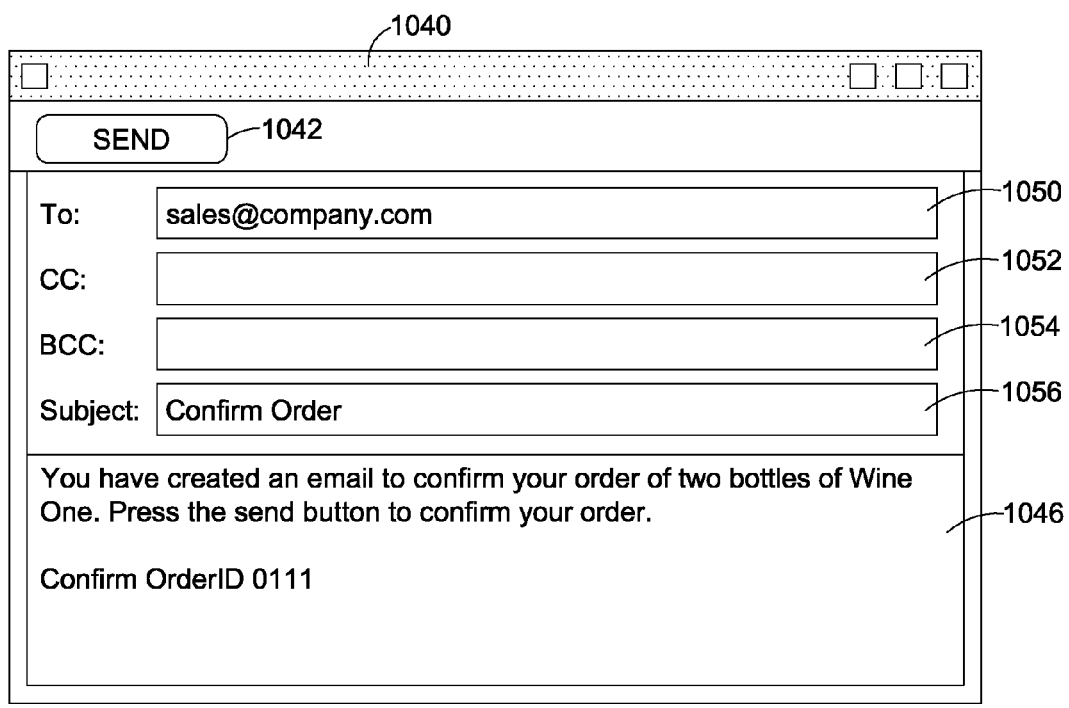
FIG. 21 shows an email message that may be used to confirm an order.

Referring now to FIG. 19, FIG. 20, and FIG. 21, FIG. 21 shows an example message composition window 1040 that may be displayed in response to a selection of the "Confirm Order" hyperlink 948a from the message body area 946 of the email display window 940 of FIG. 20 (step 846). The message composition window 1040 of FIG. 18 may include a Send button 1042, a To area 1050, a CC area 1052, a BCC area 1054, a Subject area 1056, and a message body area 1046. These display elements 1042, 1050, 1052, 1054, 1056, 1046 may possess similar and/or analogous characteristics and/or perform similar functionality as corresponding display elements 442, 450, 452, 454, 456, 446 in the message composition window 440 of FIG. 15.

Figure 22:
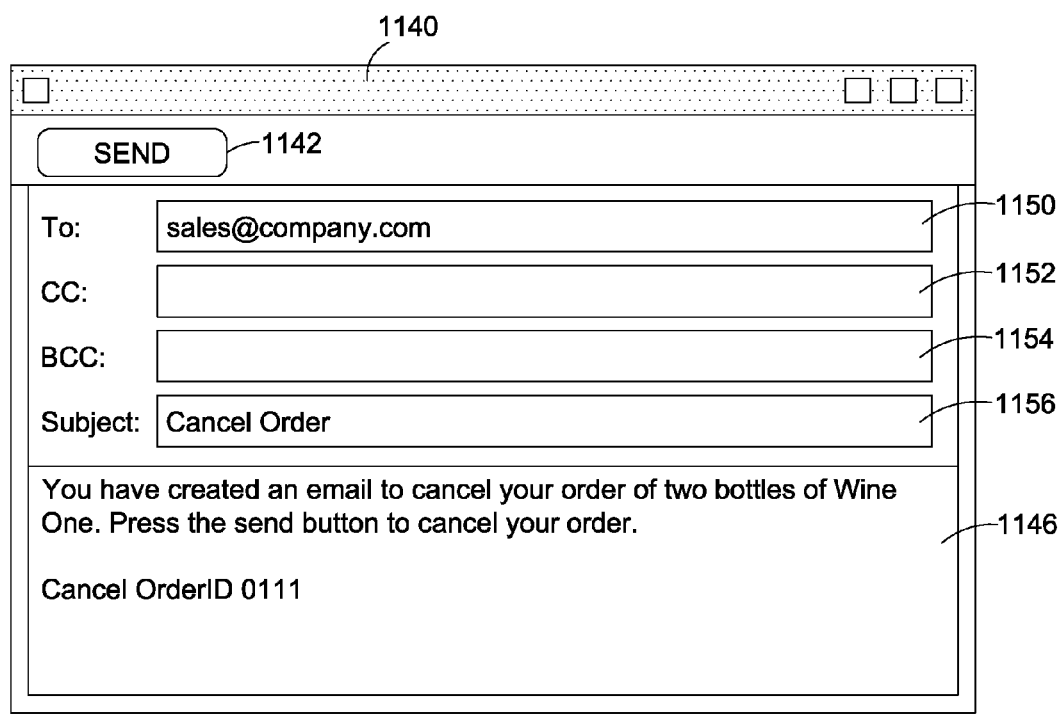
FIG. 22 shows an email message that may be used to cancel an order.

Referring now to FIG. 19, FIG. 20, and FIG. 22, FIG. 22 shows an example message composition window 1140 that may be displayed in response to a selection of the "Cancel Order" hyperlink 948b from the message body area 946 of the email display window 940 of FIG. 20 (step 846). The message composition window 1140 of FIG. 22 may include a Send button 1142, a To area 1150, a CC area 1152, a BCC area 1154, a Subject area 1156, and a message body area 1146. These display elements 1142, 1150, 1152, 1154, 1156, 1146 may possess similar and/or analogous characteristics and/or perform similar functionality as corresponding display elements 442, 450, 452, 454, 456, 446 in the message composition window 440 of FIG. 15.

Referring again to FIG. 19, the email client module 122 may send the generated confirmation response email message to the e-commerce system 100 (step 848). This may be performed in response to input from a user of the customer client device 120. As one example, the email client module 122 may, in response to a selection of the Send button 1042 in the message composition window 1040 of FIG. 21, transmit the email message based on the contents of the fields 1046, 1050, 1052, 1054, 1056 in the message composition window 1040. As another example, the email client module 122 may, in response to a selection of the Send button 1142 in the message composition window 1140 of FIG. 22, transmit the email message based on the contents of the fields 1146, 1150, 1152, 1154, 1156 in the message composition window 1140.

The email interface module 112 and the message processing module 110 may then receive the confirmation response email message (step 850). This may include, for example, the message processing module 110 periodically querying the email interface module 112 for information related to new messages received by the email interface module 112 for one or more of the email accounts used by the e-commerce system 100.

Further, the message processing module 110 may validate the contents of the confirmation response email message by determining if the message is formatted correctly and/or includes information that it should include. For example, the message processing module 110 may be configured to expect that the text of the confirmation response email message should include information that indicates an identifier of an order to which the confirmation response email message pertains. Alternatively or additionally, the message processing module 110 may validate the contents of the order email message by determining whether it includes information that matches data stored in the e-commerce database 106. For example, the message processing module 110 may determine whether an order identifier in the confirmation response email message corresponds to a valid order identifier. In an instance where the message processing module 110 determines that the information included in the order email message is invalid (e.g., if an order identifier in the message is not a valid order identifier), the message processing module 110 may send one or more emails (not depicted) to the email address from which the confirmation response email message was received, indicating that the confirmation response email message could not be correctly processed.

The message processing module 110 and/or the order execution module 108 may then determine whether the order should be executed (step 852). This may be based on, for example, the contents of the confirmation response email message. In an instance where the confirmation response email message indicates that the order should be canceled, the message processing module 110 and/or the order execution module 108 may determine that the order should be canceled. In an instance where the confirmation response email message indicates that the order should be executed, the message processing module 110 and/or the order execution module 108 may determine that the order should be executed.

Figure 23:
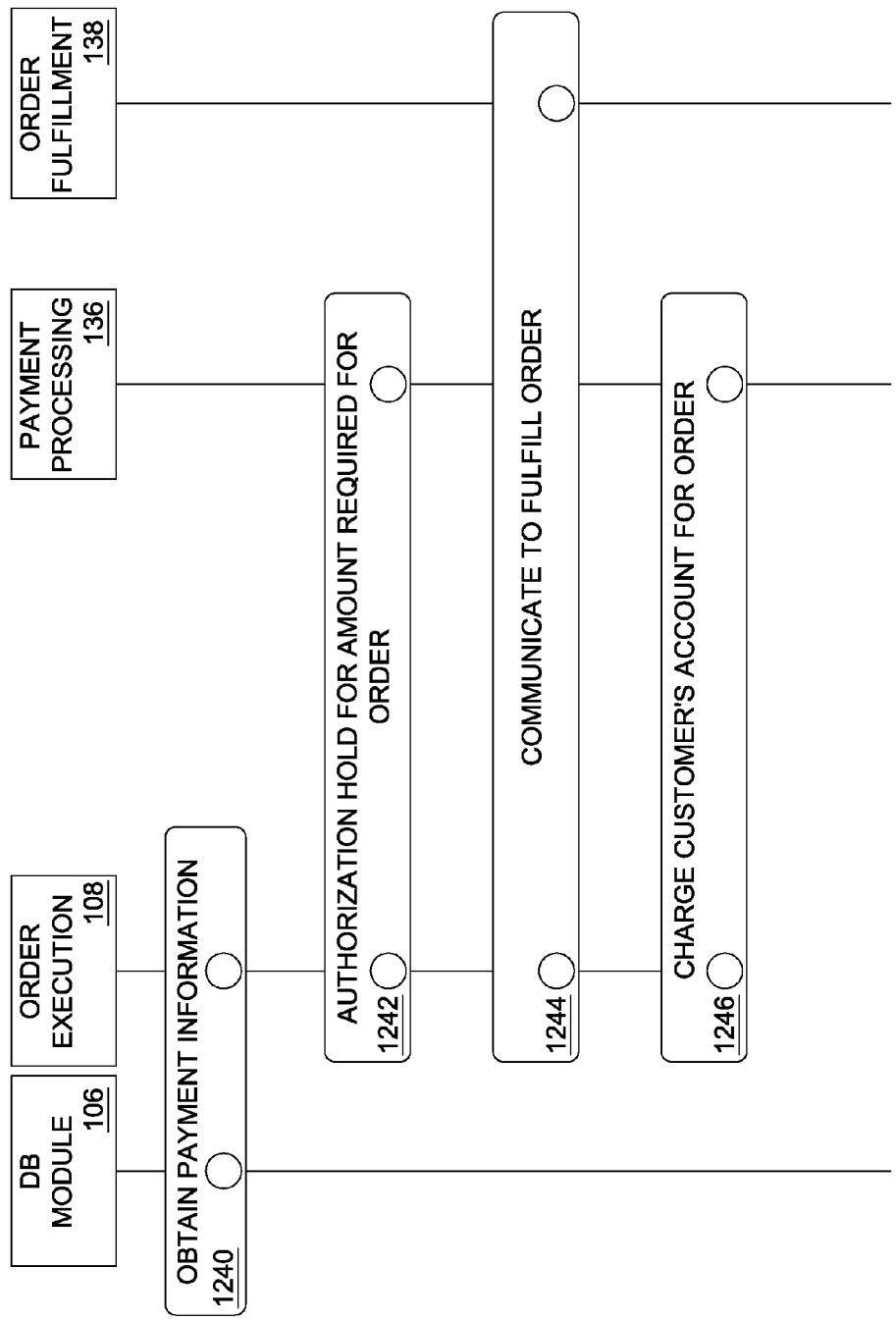
FIG. 23 shows an example order execution method.

FIG. 23 shows an example order execution method that may be utilized. FIG. 23 shows the order execution module 108 and the database module 104 of the e-commerce system 100, as well as the payment processing system 136 and the vendor order fulfillment system 138.

The method of FIG. 23 may begin with the order execution module 108 obtaining payment information associated with the customer for whom the order will be executed (step 1240). This may include the obtaining the credit card information or e-payment from the e-commerce database 106 via the database module 104. The credit card information may include a credit card number and an expiration date.

The order execution module 108 may then communicate with the payment processing module 136 to put a preauthorization hold on the customer's account for the amount required for the order (step 1242). This may include, for the credit card example, the order execution module 108 sending one or more messages to the payment processing system 136 that include the credit card information and the amount that should be held. This may also include the payment processing system 136 sending one or more messages to the order execution module 108 that indicate that the hold was successfully placed on the customer's account.

The order execution module 108 and the payment processing module 136 may then communicate to fulfill the order (step 1244). This may include, for example, the order execution module 108 sending one or more messages to the vendor order fulfillment system 138 that include information such as the shipping address of the customer, an identifier of the items being ordered, a quantity of the items being ordered, and/or other information. This may also include the vendor order fulfillment system 138 sending one or more messages to the order execution module 108 that indicate status updates with respect to fulfillment of the order. For example, the vendor order fulfillment system 138 may send one or more messages to the order execution module 108 that indicate progress with respect to the fulfillment of the order, and/or that fulfillment of the order is complete.

The order execution module 108 may then communicate with the payment processing system 136 to charge the customer's account for the amount associated with the order (step 1246). This may include the order execution module 108 sending one or more messages to the payment processing system 136 that indicate that the customer's account should be charged for the amount associated with the order. This may also include the payment processing system 136 sending one or more messages to the order execution module 108 that indicate that the customer's account was successfully charged. Charging the customer's account (step 1246) may be performed in response to the order execution module 108 receiving information from the vendor order fulfillment system 138 that indicates that the order has been completed.

Alternatively, the order execution module 108 may determine that, if a preconfigured amount of time (e.g., forty-eight hours) has passed since an order had been first communicated to the order fulfillment system 138 (step 1244) and no error or cancellation messages had been received by the order execution module 108 from the order fulfillment system 138, the order had been successfully fulfilled and that the customer's account should be charged. The order execution module 1246 may then communicate with the payment processing system 136 to charge the customer's account in response to this determination.

Alternatively or additionally, a vendor may communicate with the account management module 102 in the e-commerce system 100 to provide information via a web interface that indicates that an order has been fulfilled. In such an instance, the account management module 102 may store information in the e-commerce database 106 that indicates that the order has been fulfilled. The order execution module 108 may periodically obtain data from the e-commerce database via the database module 104 that reflects whether the order has been fulfilled. If the order execution module 108 obtains information that indicates that the order has been fulfilled, the order execution module 108 may determine that the customer's account should be charged; the order execution module 1246 may then communicate with the payment processing system 136 to charge the customer's account in response to this determination.

Figure 24:
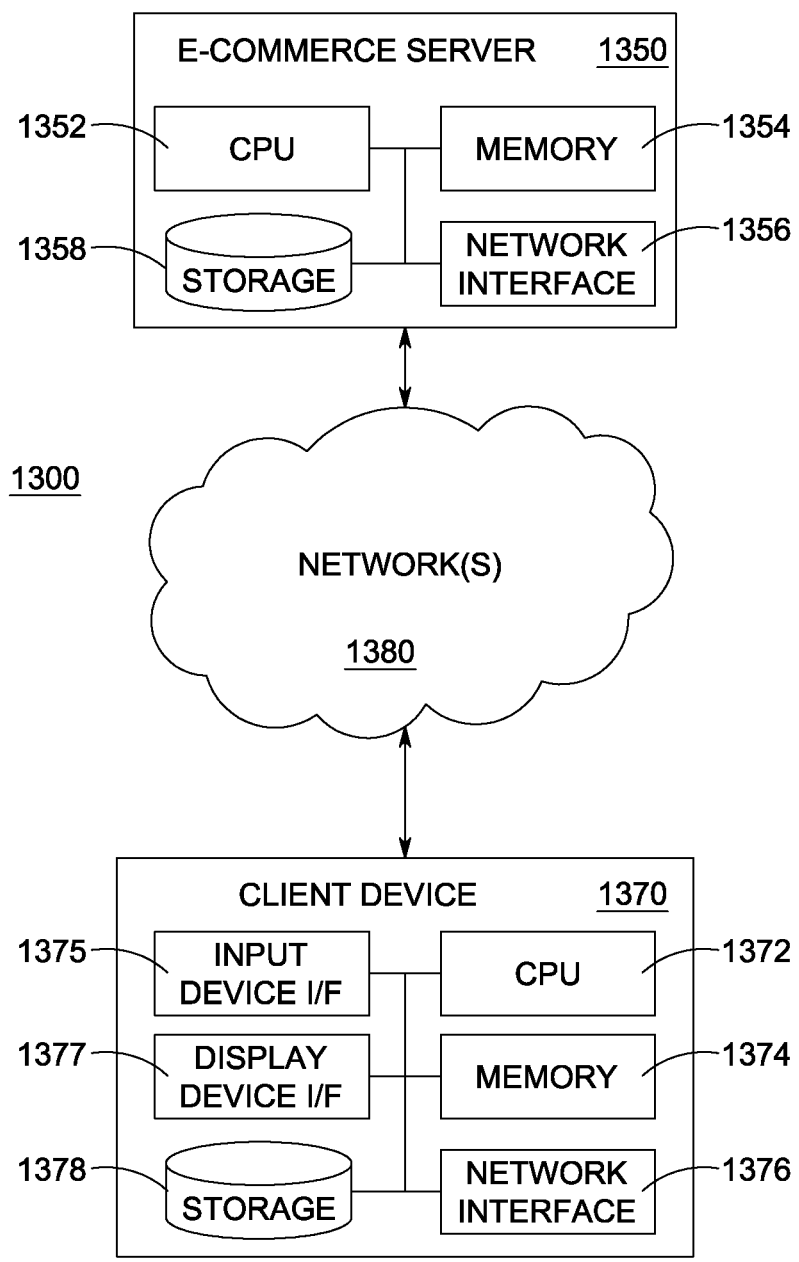
FIG. 24 shows an example system that may be used to implement features described herein.

FIG. 24 shows an example system 1300 that may be used to implement features described above with respect to FIGS. 1-23. The example system 1300 includes an e-commerce server 1350, a client device 1370, and one or more networks 1380.

The e-commerce server 1350 may include at least one processor 1352, memory device 1354, network interface 1356, and storage device 1358. The client device 1370 may include at least one processor 1372, memory device 1374, network interface 1376, input device interface 1375, display device interface 1377, and storage device 1378.

The e-commerce server 1350 may be configured to perform any feature or combination of features described above with reference to the Figures as performed by the account management module 102, database module 104, order execution module 108, message processing module 110, and/or email interface module 112. The client device 1370 may be configured to perform any feature or combination of features described above with reference to the Figures as performed by the email client module 122 and/or the web browser module in the customer client device 120. The client device 1370 may be, for example, a desktop computer, a laptop computer, a netbook, a tablet computer, a personal digital assistant (PDA), a cellular phone, or any other appropriate device.

Each or any of the memory devices 1354, 1374 may be or include a device such as a Dynamic Random Access Memory (D-RAM), Static RAM (S-RAM), or other RAM or a flash memory. Each or any of the storage devices 1358, 1378 may be or include a hard disk, a magneto-optical medium, an optical medium such as a CD-ROM, a digital versatile disk (DVDs), or Blu-Ray disc (BD), or other type of device for electronic data storage. The storage device 1358 in the e-commerce server 1350 may store the information or any subset of the information described above with reference to the Figures as stored in the e-commerce database 106.

Each or any of the network interfaces 1356, 1376 may be, for example, a communications port, a wired transceiver, or a wireless transceiver. Each or any of the network interfaces 1356, 1376 may be capable of communicating using technologies such as Ethernet, fiber optics, microwave, xDSL (Digital Subscriber Line), Wireless Local Area Network (WLAN) technology, wireless cellular technology, and/or any other appropriate technology. The network interfaces 1356, 1376 may be used by the e-commerce server 1350 and/or the client device 1370 to communicate via the one or more networks 1380. The network interface in the e-commerce server 1350 may be configured to communicate any of the messages and/or other information described above with reference to the Figures as communicated by the account management module 102, database module 104, order execution module 108, message processing module 110, and/or email interface module 112. The network interface 1376 in the client device 1370 may be configured to communicate any of the messages and/or other information described above with reference to the Figures as communicated by the email client module 122 and/or by the web browser module in the customer client device 120 used for communicating with the account management module 102.

The one or more networks 1380 may include one or more private networks and/or one or more public networks such as the Internet. The one or more networks 1380 may be based on wired and/or wireless networking technologies.

The input device interface 1375 in the client device 1370 may be an interface configured to receive input from an input device such as a keyboard, a mouse, a trackball, a scanner, a touch screen, a touch pad, a stylus pad, and/or other device. The input device interface 1375 may operate using a technology such as Universal Serial Bus (USB), PS/2, Bluetooth, infrared, and/or other appropriate technology. The input device interface 1375 may be configured to receive any or any combination of the user input described above with reference to the Figures as received by the by the email client module 122 and/or by the web browser module in the customer client device 120 used for communicating with the account management module 102.

The display device interface 1377 may be an interface configured to communicate data to a display device (not depicted). The display device interface 1377 may operate using technology such as Video Graphics Array (VGA), Super VGA (S-VGA), Digital Visual Interface (DVI), High-Definition Multimedia Interface (HDMI), or other appropriate technology. The client device 1370 may include or be connected to a display device (not depicted) via the display device interface 1377. The display device may be, for example, a monitor or television display, a plasma display, a liquid crystal display (LCD), and/or a display based on a technology such as front or rear projection, light emitting diodes (LEDs), organic light-emitting diodes (OLEDs), or Digital Light Processing (DLP). The display device may be configured to display, based on data received via the display device interface 1377, any display elements described above with reference to the Figures as displayed by the email client module 122 and/or by the web browser module in the customer client device.

The memory device 1354 and/or the storage device 1358 of the e-commerce server 1350 may store instructions which, when executed by the at least one processor 1352, cause the at least one processor 1352 to perform any feature or combination of features described above with reference to the Figures as performed by the account management module 102, database module 104, order execution module 108, message processing module 110, and/or email interface module 112. The memory device 1374 and/or the storage device 1358 of the client device 1370 may store instructions which, when executed by the at least one processor 1372, cause the at least one processor 1372 to perform any feature or combination of features described above with reference to the Figures as performed by the email client module 122 and/or by the web browser module in the customer client device 120 used for communicating with the account management module 102.

Although FIG. 24 shows a single e-commerce server 1350 and a single client device 1370, the functionality described above with reference to FIG. 24 as performed by the e-commerce serve 1350 and/or the client device 1370 may be distributed across any number of devices that possesses similar characteristics and/or that include similar components 1352, 1354, 1356, 1358, 1372, 1374, 11375, 1376, 1377 as the e-commerce server 1350 and/or the client device 1370.

While examples are provided above with respect to the Figures which includes the use of email communications, the features described above with respect to the Figures may also be implemented using different types of communications technology. For example, the features described above with reference to the Figures may also be implemented, mutatis mutandis, using technologies that include any one or any combination of: email; instant messaging; enterprise messaging; Short Message Service (SMS); Multimedia Messaging Service (MMS); and/or any other appropriate technology for the electronic communication of data.

As use herein, the term "vendor" broadly refers to and is not limited to a business, a non-profit organization, any other type of organization, and/or an individual person. One example of a business is an online retailer. Examples of non-profit organizations include charitable organizations, educational institutions such as schools and universities, arts organizations, and recreational organizations. Examples of recreational organizations include historical or preservation societies, local recreational sports leagues.

As used herein, the term "processor" broadly refers to and is not limited to a single- or multi-core general purpose processor, a special purpose processor, a conventional processor, a digital signal processor (DSP), a plurality of microprocessors, one or more microprocessors in association with a DSP core, a controller, a microcontroller, one or more Application Specific Integrated Circuits (ASICs), one or more Field Programmable Gate Array (FPGA) circuits, any other type of integrated circuit (IC), a system-on-a-chip (SOC), and/or a state machine.

As used to herein, the term "computer-readable storage medium" broadly refers to and is not limited to a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVDs, or BD, or other type of device for electronic data storage.

Although features and elements are described above in particular combinations, each feature or element can be used alone or in any combination with or without the other features and elements. For example, each feature or element as described hereinabove may be used alone without the other features and elements or in various combinations with or without other features and elements. Sub-elements of the methods and features described above with reference to the Figures may be performed in any arbitrary order (including concurrently), in any combination or sub-combination.

What is claimed is:

1. A method comprising:
  receiving, by a transceiver at a mobile device, a solicitation for a donation with a UUID of a donation amount from a Point of Event Terminal;
  generating, by a transceiver at a mobile device, a donation indication, the donation indication arising by selecting a link including the UUID associated with the donation amount that initiates a first message;
  in response to the indicator, sending by the mobile device, a first Simple Mail Transfer Protocol (SMTP) message to the point of event terminal, the first SMTP message including the associated UUID of the donation, the first SMTP message including the phone number, an email address, a MAC address, or other identifier of the mobile device and an identifier associated with the donation;
  in response to the first SMTP message, receiving by the mobile device, a second SMTP message requesting confirmation of the donation from the point of event terminal, the second message including a destination address field that indicates an email address of a user and a body field including a mailto link;
  receiving by the mobile device in response to the received second SMTP message, a user input, confirming the donation, the user input initiating the mailto link of the second message to generate a third SMTP message; and
  sending by the mobile device the third SMTP message to a point of event server confirming the donation indication, whereby the point of sale server sends identification information to an e-commerce system to obtain payment authentication, the identification information comprising at least one of the phone number, an email address, or a MAC address of the mobile device and an identifier associated with the donation, wherein a database of the point of sale server stores financial information of the user, wherein the point of sale server is configured to complete a payment for the donation amount from the stored financial information when the point of sale server receives the third SMTP message.

2. The method of claim 1, wherein the donation indication is input by a user of the mobile device.

3. The method of claim 1, wherein the donation indication is generated by a user by replying to the solicitation.

4. The method of claim 1, wherein the receiving of the user input is by a user selecting a button input embedded in the third SMTP message.

5. A mobile device comprising:
  a transceiver configured to receive a solicitation for a donation with an UUID of a donation amount from a point of event terminal;
  a processor configured to generate a donation indication, the donation indication arising by selection of a mailto link including the UUID associated with the donation amount that initiates a first Simple Mail Transfer Protocol (SMTP) message;
  the processor is further configured to send the first SMTP message to the point of event terminal, the first SMTP message including the associated UUID of the donation, wherein the first message includes the phone number, an email address, a MAC address, or other identifier of the mobile device and an identifier associated with the donation;
  the processor is further configured, in response to the first SMTP message, to receive a second SMTP message requesting confirmation of the donation from the point of event terminal, wherein the second SMTP message includes a destination address field that indicates an email address of a user and a body field with a mailto link;

the processor is further configured to receive a user initiating the mailto link of the second message to generate a third SMTP message;

the processor is further configured to send the third SMTP message to a point of sale server in response to the received user input, the point of sale server sending a communication to an e-commerce system to obtain payment authentication wherein the communication is a phone number, an email address, or a MAC address of the mobile device, and an identifier associated with the donation, a database of the ecommerce system server stores financial information of the user, and wherein the point of sale server is configured to complete a payment for the donation from the stored financial information when the point of sale server receives the third SMTP message, in response to the received user input;

wherein a user of the mobile device confirms the donation based on the sent third SMTP message.

6. The mobile device of claim 5, wherein the sent first, second and third SMTP messages are sent using a transceiver.

7. The mobile device of claim 5, wherein the donation indication is input by the user of the mobile device.

8. The mobile device of claim 5, wherein the donation indication is generated by replying to the solicitation.

9. The mobile device of claim 5, wherein the receiving of a user input is by a button input embedded in the third SMTP message.

10. A server comprising:
a processor configured to receive a first SMTP message from a mobile device and determine a donation associated with the first SMTP message, the first SMTP message comprising an identifier associated with the donation and the phone number, an email address, a MAC address, or other identifier of the mobile device; and the processor is further configured to send a second SMTP message to the mobile device to request confirmation of the donation, the second SMTP message including a mailto link that initiates the generation of an SMTP message to confirm the donation.

11. The server of claim 10, further comprising:
the processor is further configured to receive a third SMTP message from the mobile device in response to the second SMTP message, the third SMTP message confirming the donation; and the processor is further configured to complete the transaction based on the third SMTP message, the processor sending a communication to an e-commerce system to obtain payment authentication, the communication comprising and an identifier associated with the donation and at least one of a phone number, an email address or a MAC address of the mobile device;

wherein the processor is further configured to store financial information of the user in a database, and complete a payment for the donation from the stored financial information when the processor receives the third SMTP message.

12. The server of claim 10, wherein the processor comprises a plurality of processors.

13. The server of claim 10, wherein the sent second SMTP message includes a button for execution by a user of the mobile device.

14. A server comprising:
a processor configured to receive a first message from a mobile device and determine a donation associated with the first message; the processor configured to process the donation; and the processor is further configured to send a second message to the mobile device to confirm that donation, the second message including a mailto link that initiates the generation of a Simple Mail Transfer Protocol (SMTP) message to confirm the donation.

15. A server comprising:
a processor configured to generate a Simple Mail Transfer Protocol (SMTP) donation solicitation message and send the SMTP donation solicitation message to a mobile device; the processor configured to receive an SMTP response message from a mobile device generated from a mailto link included in the SMTP donation solicitation message and determine a donation associated with the SMTP response message, wherein the SMTP response message includes the phone number, an email address, a MAC address, or other identifiers of the mobile device; the processor configured to process the donation; and the processor is further configured to send an SMTP confirmation message to the mobile device to confirm that the donation was successfully processed, the SMTP confirmation message including a mailto link that initiates the generation of a third SMTP message to confirm the donation.

* * * * *